US012618604B2

(12) United States Patent
Hua et al.

(10) Patent No.: US 12,618,604 B2
(45) Date of Patent: May 5, 2026

(54) VENTILATION DOOR DEVICE FOR REFRIGERATOR

(71) Applicant: JIANGSU LEILI MOTOR CO., LTD., Changzhou City (CN)

(72) Inventors: Sheng Hua, Changzhou City (CN); Fugang Wang, Changzhou City (CN); Wei Tao, Changzhou City (CN); Zhen Wang, Changzhou City (CN); Jiahui Feng, Changzhou City (CN)

(73) Assignee: Jiangsu Leili Motor Co., Ltd., Changzhou City (CN)

( * ) Notice: Subject to any disclaimer, the term of this patent is extended or adjusted under 35 U.S.C. 154(b) by 851 days.

(21) Appl. No.: 17/795,133

(22) PCT Filed: Jan. 26, 2021

(86) PCT No.: PCT/CN2021/073742
§ 371 (c)(1),
(2) Date: Jan. 9, 2023

(87) PCT Pub. No.: WO2021/169708
PCT Pub. Date: Sep. 2, 2021

(65) Prior Publication Data

US 2023/0143230 A1 May 11, 2023

(30) Foreign Application Priority Data

Feb. 28, 2020 (CN) ......................... 202010128218.0
Feb. 28, 2020 (CN) ......................... 202010128529.7

(51) Int. Cl.
*F25D 17/06* (2006.01)
*F25D 29/00* (2006.01)
*H05B 1/02* (2006.01)

(52) U.S. Cl.
CPC ........... *F25D 17/065* (2013.01); *F25D 29/00* (2013.01); *H05B 1/0252* (2013.01); *H05B 2214/02* (2013.01)

(58) Field of Classification Search
CPC ...... F25D 17/045; F25D 17/065; F25D 21/02; F25D 21/08; F25D 29/00; H05B 1/0252; H05B 2214/02; F16H 2035/006
See application file for complete search history.

(56) References Cited

U.S. PATENT DOCUMENTS

2016/0348806 A1* 12/2016 Noritake ............... F16K 31/043
2017/0045283 A1 2/2017 Saito et al.
2019/0293337 A1* 9/2019 Yokoe ................... F25D 17/045

FOREIGN PATENT DOCUMENTS

CN 100523676 8/2009
CN 103573949 A 2/2014
(Continued)

OTHER PUBLICATIONS

English Translation of the Int'l Search Report & Written Opinion issued in Int'l Appl. No. PCT/CN2021/073742 (Mar. 11, 2021).

*Primary Examiner* — Steven B McAllister
*Assistant Examiner* — Michael James Giordano
(74) *Attorney, Agent, or Firm* — Barnes & Thornburg

(57) ABSTRACT

A ventilation door device for a refrigerator comprises: a frame, having an end plate provided with an opening portion, and having a blocking plate assembly rotatably mounted on the end plate, wherein the blocking plate assembly can rotate between a closed position in which the opening portion is completely closed and an open position in which the opening portion is completely open; a housing, engaging with the frame, wherein a driving chamber is formed between the housing and the frame; and a driving module, wherein the driving module is at least partially held in the driving chamber, and drives the blocking plate assem-
(Continued)

bly to rotate. The frame has a housing engagement portion located on a side edge of the end plate and extending substantially perpendicular to the end plate. The housing is connected to the housing engagement portion of the frame. The blocking plate assembly comprises a blocking plate mounted on the end plate and an elastic component provided on the blocking plate. When the blocking plate assembly is in the closed position, the elastic component abuts the frame and deforms elastically to seal the opening portion. The end plate of the frame has a sealing portion arranged around the opening portion and protruding from the end plate. When the blocking plate assembly is in the closed position, the elastic component abuts the sealing portion of the frame.

18 Claims, 12 Drawing Sheets

(56) References Cited

FOREIGN PATENT DOCUMENTS

| | | | |
|---|---|---|---|
| CN | 204574672 | U | 8/2015 |
| CN | 104896867 | | 9/2015 |
| CN | 105042993 | | 11/2015 |
| CN | 106195418 | | 12/2016 |
| CN | 107110316 | | 8/2017 |
| CN | 107701679 | | 2/2018 |
| CN | 209655666 | U | 11/2019 |
| CN | 111156759 | | 5/2020 |
| CN | 111156760 | | 5/2020 |
| CN | 211575652 | U | 9/2020 |
| CN | 211977334 | U | 11/2020 |
| CN | 212081727 | U | 12/2020 |

* cited by examiner

VENTILATION DOOR DEVICE FOR REFRIGERATOR

CROSS-REFERENCE TO RELATED APPLICATIONS

This application is a US national stage application under 35 USC § 371 of PCT Application No. PCT/CN2021/073742, filed Jan. 26, 2021, which claims priority to Chinese patent application No. 202010128529.7, filed on Feb. 28, 2020, and Chinese patent application No. 202010128218.0, filed on Feb. 28, 2020. The contents of the above-mentioned patent applications are hereby fully incorporated by reference herein in their entirety as portions of this application.

TECHNICAL FIELD

The present disclosure relates to a ventilation door device for a refrigerator and a refrigerator having said ventilation door device.

BACKGROUND

Refrigerator is a common household appliance having main functions including storage and preservation. A refrigerator may have more than one storage compartments to store different kinds of food or other items. Generally, different storage compartments need to be maintained at different temperatures. To this end, a refrigerator is provided with cold air passages leading to each of storage compartments, and the cold air passes through the cold air passages to adjust the temperatures of different storage compartments. Each cold air passage can be provided with a ventilation door device to change the amount of cold air passing through by changing the opening and closing of each cold air passage, thereby realizing dynamic adjustment of the temperature of each storage compartments. However, current ventilation door devices have several problems.

First, the existing refrigerator ventilation door solution is unstable, and there is a situation in which the refrigerator issues an order to open or close the ventilation door, but the ventilation door could not be actually opened or closed. This will result in the inability to continuously and dynamically adjust the cold air flowing into each storage compartment as needed, and the food therein could not get appropriate temperature, and the freshness period will be greatly shortened.

Second, in the existing ventilation door solutions of refrigerators, most use a multi-stage gear transmission mechanism. When the ventilation door is in the closed position, the teeth of adjacent gears abut against each other. In order to eliminate the tolerances of gears, the pulse number for closing the door of the stepper motor is usually designed greater than the pulse number for opening the door, so that multiple gears will be stalled (in other words, rotor-locked) when the door is closed, and the accuracy of the door closing can be improved. For the traditional multi-stage gear transmission mechanism, the stalling time is too long, and the tooth-breaking phenomenon caused by insufficient gear strength might occur. Moreover, big noise is generated during the stalling process. Traditional solutions are difficult to solve both the problems of noise and tooth-breaking.

SUMMARY OF THE INVENTION

Regarding to the above-mentioned problems, this disclosure provides a new type of ventilation door device and a refrigerator having said ventilation door device, which solves the above problems due to the following technical features and brings other technical effects.

In a first aspect of the present disclosure, a ventilation door device for a refrigerator is provided. The ventilation door device includes: a frame having an end plate provided with an opening portion, and having a blocking plate assembly rotatably mounted to the end plate, the blocking plate assembly is able to rotate between a closed position where the opening portion is completely closed and an open position where the opening portion is completely open; a housing engaging the frame and forming a driving chamber between the housing and the frame; and a driving module at least partially being held in the driving chamber and driving the blocking plate assembly to rotate.

In one embodiment, the frame has a housing engagement portion located at the side edge of the end plate and extending substantially perpendicular to the end plate, and the housing is connected to the housing engagement portion of the frame.

In one embodiment, the blocking plate assembly includes a blocking plate installed on the end plate and an elastic component disposed on the blocking plate, when the blocking plate assembly is in the closed position, the elastic component abuts the frame and elastically deforms to seal the opening portion.

In one embodiment, the end plate of the frame has a sealing portion arranged around the opening portion and protruding from the end plate, and when the blocking plate assembly is in the closed position, the elastic component abuts the sealing portion of the frame.

In one embodiment, a reinforcing rib is provided on the side of the blocking plate facing away from the elastic component.

In one embodiment, the blocking plate assembly includes a first shaft portion and a second shaft portion provided at both ends of the blocking plate, and the blocking plate assembly is mounted to the frame through the first shaft portion and the second shaft portion, a clamping structure is provided inside the first shaft portion, and the driving module drives the blocking plate assembly to rotate through the clamping structure.

In one embodiment, the ventilation door device further includes a heater installed to the end plate and at least partially surrounding the opening portion.

In an embodiment, the frame further includes an edge plate extending from an outer edge of the end plate, and the edge plate surrounds the heater.

In one embodiment, the shape of the heater at least partially matches the shape of the end plate.

In one embodiment, the ventilation door device is configured to generate an electrical signal when the blocking plate assembly is in the closed position or the open position, and when the blocking plate assembly is in a middle position between the closed position and the open position, no electrical signal is generated or another electrical signal is generated. The ventilation door device is configured to activate the heater if the disappearance of said electrical signal or the change from said electrical signal to said another electrical signal is not detected within a predetermined time after receiving the command to rotate the blocking plate assembly.

In an embodiment, the ventilation door device further includes a micro switch, and a transmission gear in the driving module includes two contacts extending radially from said transmission gear, wherein the micro switch and the transmission gear are designed as follows: when the blocking plate assembly is in the closed position, one of the two contacts triggers a static contact of the micro switch, so that the micro switch generates the electrical signal; when the blocking plate assembly is in the open position, the other of the two contacts triggers the static contact of the micro switch, so that the micro switch generates the electricity signal; and when the blocking plate assembly is in the middle position between the closed position and the open position, neither of the two contacts triggers the static contact of the micro switch, so that the micro switch does not generate the electrical signal or generates another electrical signal.

In one embodiment, the predetermined time is 3 seconds to 8 seconds.

In one embodiment, the ventilation door device further has a circuit board, and the circuit board has: a first coupling portion for coupling with the micro switch; a second coupling portion for coupling with the driving module; and a third coupling part for coupling the heater.

In one embodiment, the driving module includes: a stepper motor; a teeth missing gear, which is connected to the stepper motor; a sector gear, which meshes with the teeth missing gear; an output shaft, which is connected to the sector gear and is connected to the blocking plate; and the stepper motor can drive the blocking plate to rotate via the teeth missing gear, the sector gear and the output shaft.

In one embodiment, the sector gear includes a sector gear teeth portion, a cylindrical portion and a sector gear output portion which are sequentially arranged along an axial direction; and the teeth missing gear includes a shaft portion and a circular gear teeth portion, the circular gear teeth portion includes a circular gear section with gear teeth and an arc section without gear teeth, and the gear teeth on the gear teeth section mesh with the gear teeth on the sector gear teeth portion. The output portion of the sector gear can be in the form of a rotating shaft and is used to connect to a clamping structure in the form of a slot at the first shaft portion of the blocking plate; alternatively, the output portion of the sector gear can also be in the form of a slot and is used to connect to a clamping structure in the form of a protrusion at the first shaft portion.

In one embodiment, the frame has a bottom plate portion extending perpendicular to the plane where the opening portion is located, and the bottom plate portion includes: a first cylindrical portion for rotatably supporting the cylindrical portion of the sector gear inside the first cylindrical portion; and a second cylindrical portion for rotatably supporting the shaft portion of the teeth missing gear inside the second cylinder portion.

In one embodiment, inside the first cylinder portion, the bottom plate portion has a through hole allowing the sector gear output portion passing through as the output shaft to extend to the blocking plate.

In one embodiment, the second cylindrical portion has an arc groove, and the arc groove is recessed away from the end surface of the second cylindrical portion, and the center of the arc groove coincides with the axis of the cylinder part, and the arc groove extends between two limiting surfaces; and the teeth missing gear has an arc-shaped protrusion that protrudes from the side surface of the circular gear teeth portion of the teeth missing gear and is configured to be able to extend into the arc groove, and move along the arc groove with the rotation of the teeth missing gear, any one of the two limiting surfaces is used to abut the arc-shaped protrusion to limit the rotation of the teeth missing gear.

In one embodiment, the ventilation door device further includes a micro switch with a static contact; the teeth missing gear further includes a contact portion having two contacts; when the blocking plate is in the open position, one of the two contacts engages the static contact of the micro switch, and the micro switch sends an electrical signal; when the blocking plate is in the closed position, the other of the two contacts engages the static contact of the micro switch, and the micro switch sends the electrical signal; when the blocking plate is in a middle position between the closed position and the open position, the contact portion does not engage the static contact of the micro switch, and the micro switch does not send the electrical signal or sends a different signal from said electrical signal.

In one embodiment, the contact portion is arranged on the side of the gear teeth portion of the teeth missing gear away from the shaft portion, and the contact portion has two arms extending radially outwardly, the end of each arm forms a contact, and each contact is located farther from the center of the teeth missing gear than the remaining portions of the contact portion.

In one embodiment, the outer periphery of the teeth missing gear has an arc section next to its teeth section; when the blocking plate is in the closed position, the outer surface of the arc section of the teeth missing gear abuts the sector gear, thereby preventing the sector gear from rotating in the direction of opening the blocking plate.

In one embodiment, the outer periphery of the sector gear has a concave locking arc next to its teeth section, and the concave locking arc is recessed toward the center of the sector gear; when the blocking plate is in the closed position, a part of the arc section enters the interior of the concave locking arc, preventing the concave locking arc from rotating relative to the arc section, thereby the teeth missing gear prevents the sector gear from rotating in the direction of opening the blocking plate.

In one embodiment, when the blocking plate is in the closed position, the distance between any point on the concave locking arc and the center of the teeth missing gear is greater than the radius of the arc section, so as to not block the arc section from rotating relative to the concave locking arc, thereby the teeth missing gear can idly rotate by an idling angle in the direction of closing the ventilation door.

In one embodiment, the frame has a second cylindrical portion that rotatably supports the teeth missing gear, and the second cylindrical portion has an arc groove, and the arc groove extends between two limiting surfaces; the teeth missing gear has an arc-shaped protrusion configured to be able to extend the interior of the arc groove and move along the arc groove with the rotation of the teeth missing gear, until it abuts against any one of the two limiting surfaces; and the angle between the two limiting surfaces is a first angle, and the angle across which the teeth missing gear rotates when the blocking plate is driven to rotate from the open position to the closed position is a second angle, and the first angle is equal to the sum of the second angle and the idling angle.

In one embodiment, the radius of the arc section of the teeth missing gear is R1, the distance from the arc end point of the concave locking arc of the sector gear to the center of the sector gear is L2, the distance between centers of the sector gear and the teeth missing gear is L, and wherein R1+L2−L is the amount of interference L1, and L1 is greater than zero.

In one embodiment, the range of the interference amount L1 is: 0.05 mm≤L1≤1 mm.

The driving module includes: a stepper motor; a teeth missing gear connected to the stepper motor, and the teeth missing gear includes an arc section without gear teeth; a sector gear meshing with the teeth missing gear; and an output shaft connected to the sector gear and connected to the blocking plate; wherein the stepper motor can drive the blocking plate to rotate via the teeth missing gear, the sector gear and the output shaft; and wherein when the blocking plate is in the closed position, a portion of the arc section of the teeth missing gear is located between two teeth of the sector gear, and the teeth missing gear prevents the sector gear from rotating in the direction of opening the shutter.

In one embodiment, the sector gear has a first tooth that enters meshing last when the blocking plate is closed and a second tooth next to the first tooth, the end surface of the first tooth facing the output shaft is farther away from the end surface of the second tooth facing the output shaft; the teeth missing gear further has an arc-shaped groove, the radius of the outer surface of the arc-shaped groove is smaller than the radius of the outer surface of the arc section, the arc-shaped groove is located on the side of the arc section away from the output shaft, the outer surface of the arc section and the outer surface of the arc-shaped groove are connected by an inner end surface; when the blocking plate is in the closed position, the arc-shaped groove accommodates the first tooth inside, and the outer surface of the arc section is partially located between the first tooth and the second tooth and abuts against the second tooth, the second tooth is prevented from rotating relative to the arc section, so that the teeth missing gear prevents the sector gear from rotating in the direction of opening the blocking plate.

In one embodiment, when the blocking plate is in the closed position, the distance between any point on the second tooth and the center of the teeth missing gear is greater than the radius of the arc section, so as to not prevent the arc section from rotating relative to the second tooth, so that the teeth missing gear can idly rotate by an idling angle in the direction of closing the ventilation door.

In one embodiment, the sector gear further has a third tooth next to the second tooth, the third tooth and the second tooth are connected by a connecting portion at the side adjacent to the output shaft.

In one embodiment, the end faces of the third tooth and the second tooth on the side adjacent to the output shaft are closer to the output shaft than the end faces of the other teeth on the sector gear on the side adjacent to the output shaft.

In one embodiment, the radius of at least part of the addendum circle of the second tooth of the sector gear is smaller than the radius of the addendum circles of the remaining teeth.

In one embodiment, a part of the second tooth away from the output shaft is cut away.

In one embodiment, the part of the second tooth outside the inner end surface of the arc section is completely cut off.

In one embodiment, both ends of the arc section of the teeth missing gear are immediately connected to the gear teeth section, and the radius of the arc section of the teeth missing gear is larger than that of the addendum circle of the gear teeth section.

In one embodiment, the outer peripheral surface of the arc section of the teeth missing gear and the tooth face of the first tooth of the gear teeth section that enters meshing firstly when the door is opened are connected by an arc-shaped guide surface.

In a second aspect of the present disclosure, a refrigerator is provided, which includes: one or more storage compartments; one or more cold air passages leading to the one or more storage compartments; and one or more ventilation door devices as mentioned above, wherein the opening portion of each ventilation door device is arranged in the corresponding cold air passage, so that the cold air delivery amount in the corresponding cold air passage is controlled by the opening and closing of the opening portion of the corresponding ventilation door device.

Hereinafter, the best embodiments for implementing the present disclosure will be described in more detail with reference to the accompanying drawings, so that the features and advantages of the present disclosure can be easily understood.

DESCRIPTION OF THE DRAWINGS

In order to explain the technical solutions of the embodiments of the present disclosure more clearly, the accompanying drawings of the embodiments of the present disclosure will be briefly introduced below. The drawings are only used to show some embodiments of the present disclosure, rather than limiting all the embodiments of the present disclosure to them.

LIST OF REFERENCE NUMBERS

Figure 1:
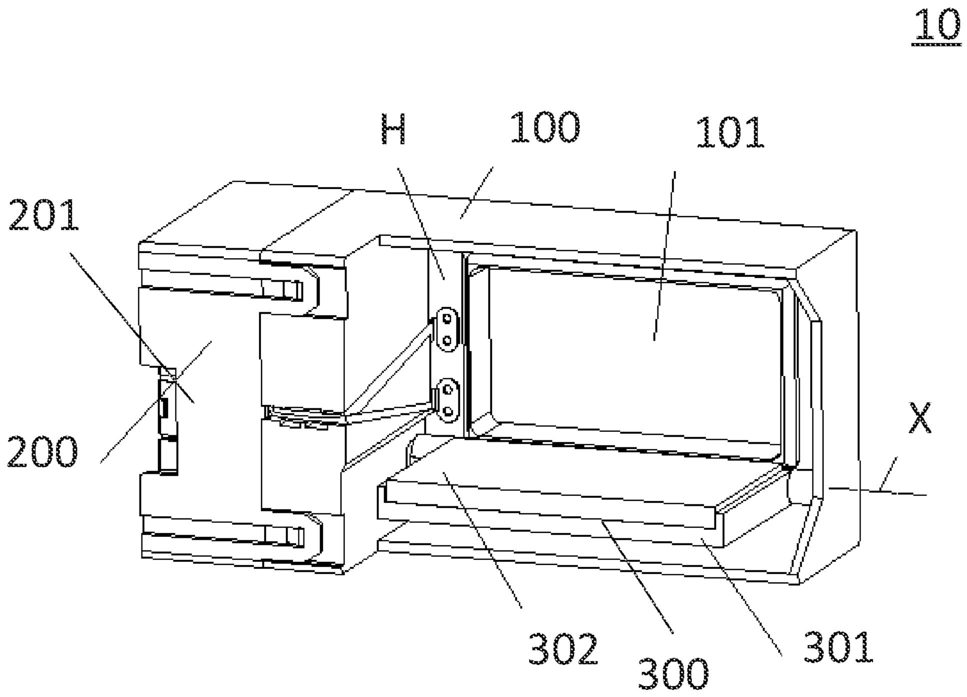
FIG. 1 shows a perspective view of a ventilation door device according to an exemplary embodiment, in which the blocking plate assembly is in an open position.

10 ventilation door device
100 frame
101 opening portion
102 sealing portion
103 end plate
104 edge plate
105 wiring portion
106 bottom plate potion
107 housing engagement portion
200 housing
300 blocking plate assembly
301 blocking plate
302 elastic component
303 flat plate portion
305 first shaft
306 second shaft
307 reinforcing rib
400 driving module
402 transmission assembly
403 stepper motor
404 motor output shaft
405, 405' teeth missing gear
406, 406 sector gear
407 output shaft
408 circuit board
409 micro switch
410 first cylindrical portion
411 second cylindrical portion
412 first limiting surface
413 second limiting surface
414 arc groove
415 supporting portion
416 slot portion
417 through hole
421 first coupling portion
422 second coupling portion
423 third coupling portion
424 motor limiting portion
425 tinned hole
H heater
X rotation axis
431 shaft portion
432, 432' sector gear teeth portion
433 cylindrical portion
434, 434' sector gear output potion
435 flat portion
436 gear teeth section
437 concave locking arc
441 shaft portion
442 gear teeth section
443, 443' contact portion
444, 444' gear teeth section
445, 445' arc section
446 contact
447 shaft hole
448, 448' arc-shaped protrusion
451 first tooth of sector gear
452 second tooth of sector gear
453 third tooth of the sector gear
454 connection portion
455 arc shaped groove
456 inner surface
457 first tooth of teeth missing gear
458 arc shaped guiding surface

DETAILED DESCRIPTION

In order to make the objectives, technical solutions and advantages of the technical solutions of the present disclosure clearer, the technical solutions of the embodiments of the present disclosure will be clearly and completely described below in conjunction with the drawings of the specific embodiments of the present disclosure.

The same reference numerals in the drawings represent the same components. It should be noted that the described embodiments are part of the embodiments of the present disclosure, rather than all of the embodiments.

Based on the described embodiments of the present disclosure, all other embodiments obtained by those of ordinary skill in the art without creative labor are within the protection scope of the present disclosure.

1. Overall Structure

Figure 2:
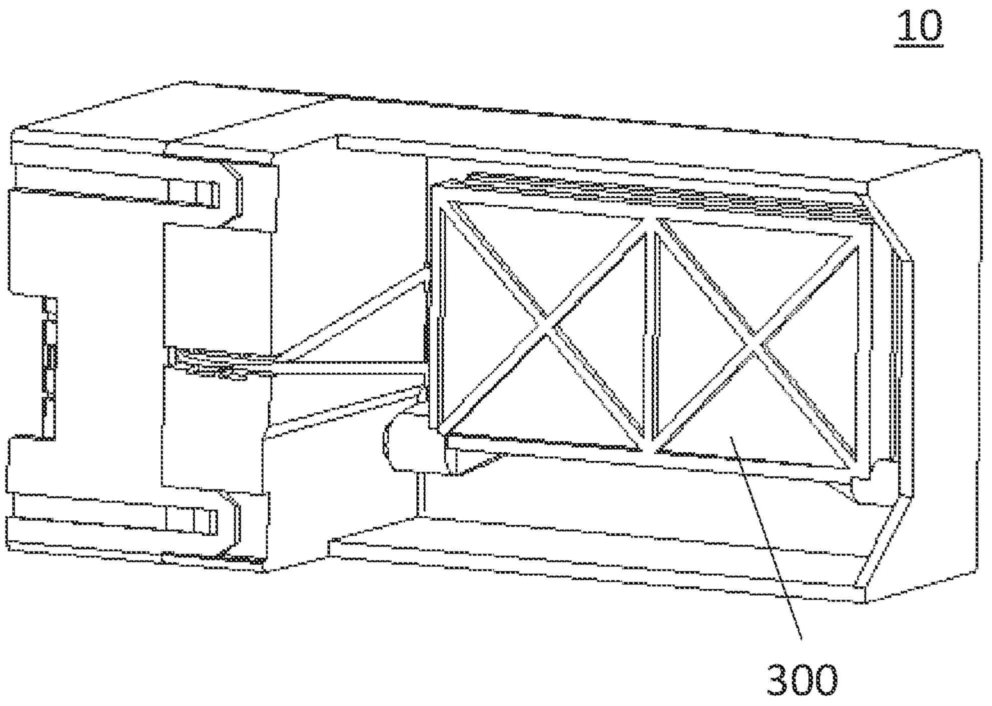
FIG. 2 shows a perspective view of the ventilation door device according to an exemplary embodiment, wherein the blocking plate assembly is in a closed position.
Figure 3:
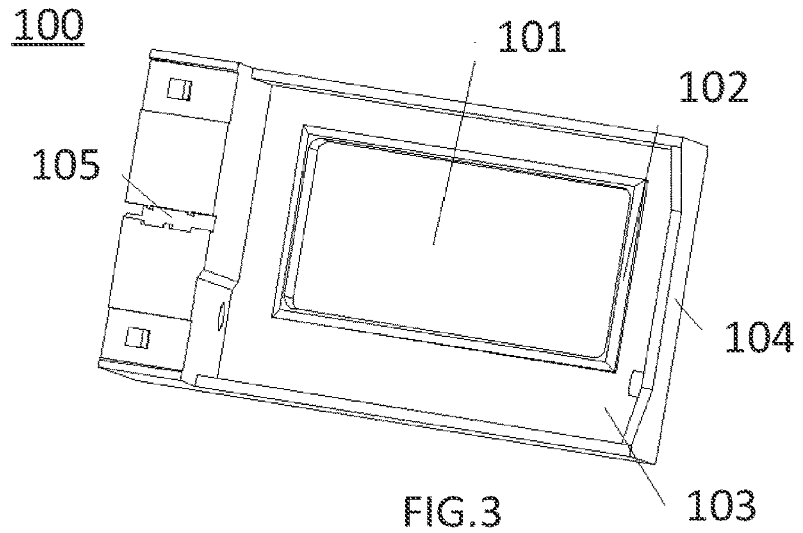
FIG. 3 shows the frame of the ventilation door device, in which the blocking plate assembly of the frame is removed.
Figure 4A:
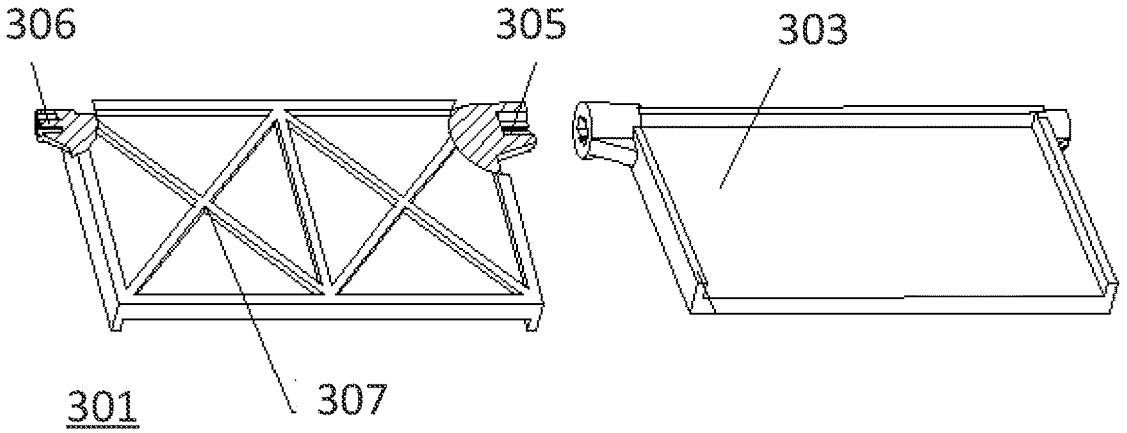
FIG. 4A shows the first embodiment of the blocking plate of the ventilation door device according to the exemplary embodiment from two perspectives.
Figure 4B:
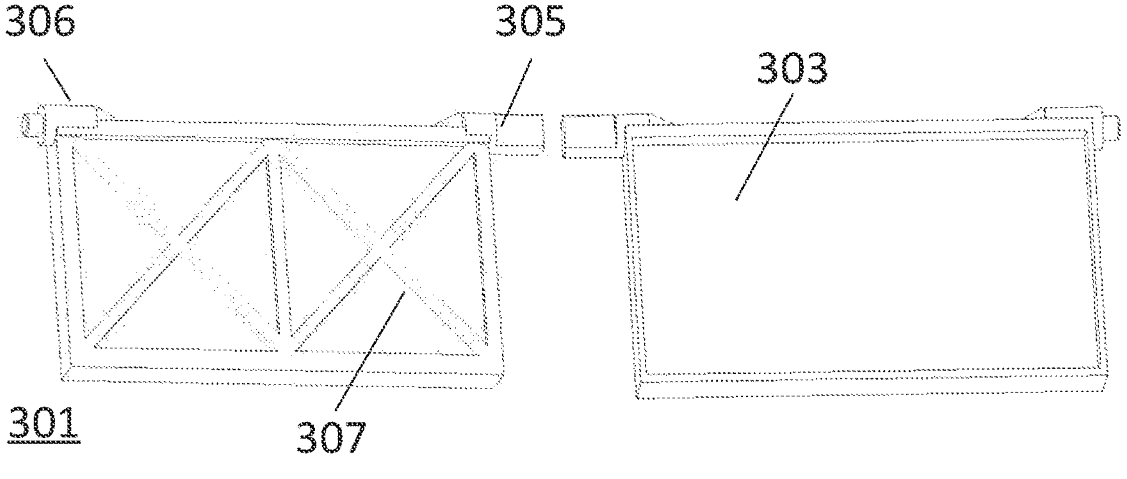
FIG. 4B shows the second embodiment of the blocking plate of the ventilation door device according to the exemplary embodiment from two perspectives.
Figure 5:
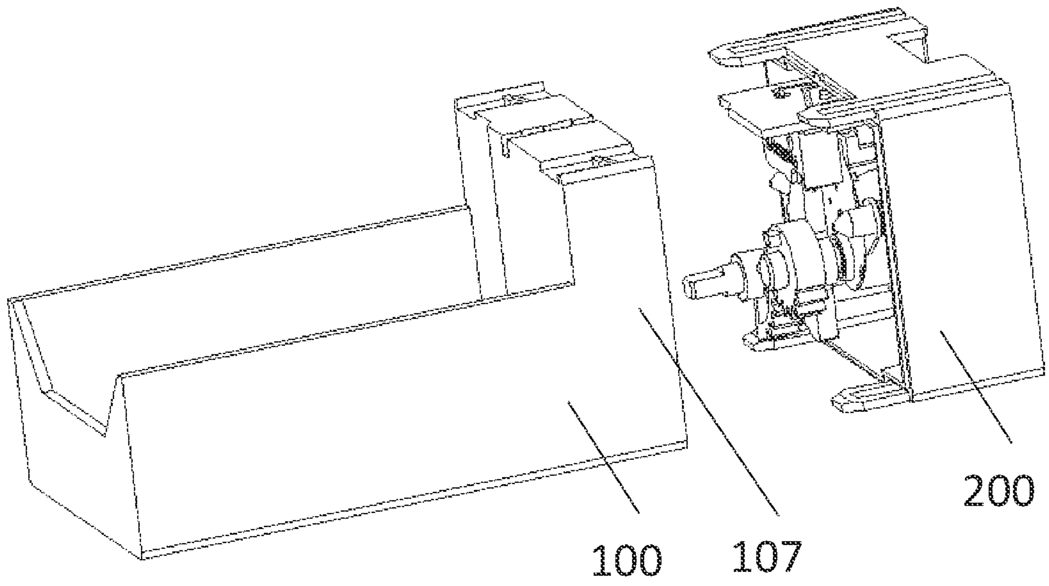
FIG. 5 shows a three-dimensional view of the ventilation door device according to an exemplary embodiment, in which the frame and the housing are in a separated state.
Figure 6:
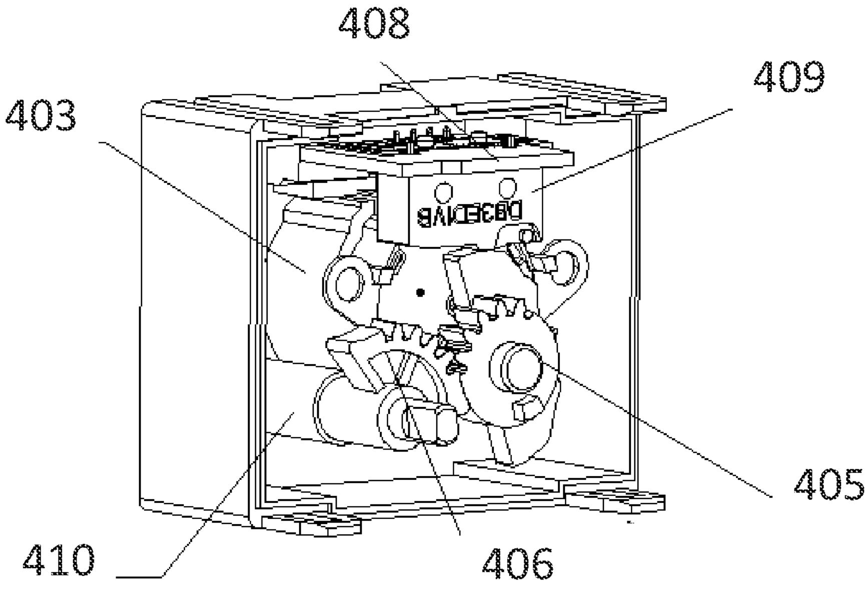
FIG. 6 shows the drive chamber of the ventilation door device according to an exemplary embodiment.

An exemplary embodiment of the ventilation door device 10 of the present disclosure will be described with reference to FIGS. 1 to 6. FIGS. 1 and 2 show three-dimensional views of a ventilation door device 10 according to an exemplary embodiment, in which the blocking plate assembly 300 are in an open position and a closed position, respectively. FIG. 3 shows a frame 100 of the ventilation door device 10, in which the blocking door assembly 300 is removed from the frame 100. FIGS. 4A and 4B show the blocking plate 301 of the ventilation door device 10 according to an exemplary embodiment from two perspectives. FIG. 5 shows a perspective view of the ventilation door device 10 according to an exemplary embodiment, in which the frame 100 and the housing 200 are separated. FIG. 6 illustrates the driving chamber of the ventilation door device 10 according to an exemplary embodiment.

The ventilation door device 10 mainly includes a frame 100, a housing 200 and a driving module. The housing 200 is joined to the frame 100 and a driving chamber is formed between the housing 200 and the frame 100. The driving module is at least partially held in the driving chamber, as shown in FIG. 6.

The frame 100 has an end plate 103 provided with an opening portion 101. The opening portion 101 may be an opening and closing port of a cold air passage that delivers cold air to the storage compartment of the refrigerator to maintain its temperature. In other words, the opening portion 101 is provided in the corresponding cold air passage of the refrigerator, and the cold air delivery amount in the corresponding cold air passage can be adjusted by controlling the opening and closing of the opening portion 101.

The frame 100 also has a blocking plate assembly 300 rotatably mounted to the end plate 103, and the blocking plate assembly 300 can be rotated between a closed position where it completely closes the opening portion 101 and an open position where it completely opens the opening portion 101. FIG. 1 shows a state where the blocking plate assembly 300 is in a fully open position, where the blocking plate assembly 300 is substantially orthogonal to the end plate 103 of the frame 100, and the rotation axis X of the blocking plate assembly 300 is shown. FIG. 2 shows a state where the blocking plate assembly 300 is in a closed position. Although the drawings show that the open position may differ from the closed position by an angle of 90 degrees, the solution of the present disclosure is not limited to this, and the open position may differ from the closed position by an angle of more than 90 degrees.

The frame 100 also has a housing engagement portion 107 located at the side edge of the end plate 103 and extending substantially perpendicular to the end plate 103. Specifically, the housing engagement portion 107 may be a structural part extending from the side edge of the frame 100 in a direction perpendicular to the rotation axis of the blocking plate 301 and perpendicular to the end plate 103 of the frame 100. In this way, the frame 101 may be divided into two portions: the housing engagement portion 107 and the remaining portion including the end plate 103. For example, referring to FIG. 5, these two portions may be arranged in an overall L-shape. For example, the housing engagement portion 107 may have a snap structure, and the housing 200 is connected to the housing engagement portion 107 by snapping. However, the connection between the housing and the frame is not limited to a snap connection, but can also be accomplished by screw fastening or ultrasonic welding.

FIG. 3 clearly shows the end plate 103 of the frame 100. The opening portion 101 is provided in the end plate 103, and its shape is not limited, and may be, for example, a rectangular opening. For example, the frame 100 has an edge plate 104 extending from the outer peripheral edge of the end plate 103 for protecting the heater H described below.

FIGS. 4A and 4B show the blocking plate 301 of the blocking plate assembly 300. The main function of the blocking plate 301 is to control the amount of air passing through the opening portion 101. The size and shape of the blocking plate 301 is designed to close the opening portion 101, for example, it may have a rectangle shape as shown in the drawings, and the size of it is slightly larger than the opening portion 101. The blocking plate 301 may include a first shaft portion 305 and a second shaft portion 306 provided at both ends thereof, and the blocking plate 301 is mounted to the frame 100 through the first shaft portion 305 and the second shaft portion 306. Then, the blocking plate 301 is rotatable relative to the frame 100 around the first and second shaft portions 305, 306. A clamping structure is provided inside the first shaft portion 305, and the driving module can engage the clamping structure, for example, through corresponding features on its output shaft, so as to drive the blocking plate 301 through the clamping structure to rotate. For example, as shown in FIG. 4A, a recess is provided inside the first shaft portion 305, the output shaft of the driving module is provided with a blade that engages in the recess, and the output shaft of the driving module can snap into the recess of the first shaft portion 305 so as to rotate the first shaft portion 305. Alternatively, a recess may be provided inside the output shaft of the driving module, and a blade may be provided at the end of the first shaft portion, as shown in FIG. 4B. For example, on one side of the blocking plate 301 is a flat portion 303 for placing an elastic component 302, and on the other side, that is, the side facing away from the elastic component 302, is provided with reinforcing ribs 307. The arrangement of the reinforcing ribs 307 can reinforce the strength of the blocking plate 301, prevent the blocking plate assembly 300 from shrinking, and improve the surface appearance.

The elastic component 302 may be attached to the flat portion 303 of the blocking plate 301, and the shape of the elastic component 302 can match the shape of the flat portion 303 of the blocking plate 301, for example, a sheet-like rectangular shape. The elastic component 302 may be composed of materials such as foamed polyurethane. When the blocking plate assembly 300 is in the closed position, the elastic component 302 abuts the frame 100 and deforms elastically to seal the opening portion 101. For example, the end plate 103 of the frame 100 has a sealing portion 102 around the opening portion 101 and protruding from the end plate 103. When the blocking plate assembly 300 is in the closed position, the elastic component 302 abuts against the sealing portion 102 of the frame 100. The abutment of the elastic component 302 against the sealing portion 102 effectively increases the sealing performance of the blocking plate 301 to the opening portion 101.

According to an exemplary solution, the housing 200 and the frame 100 are connected in a snap-fit manner. For example, FIG. 5 shows that the frame 100 and the housing 200 are in a separated state.

The driving module drives the blocking plate assembly 300 to rotate. The driving module may include a motor and a transmission assembly. The motor is, for example, a stepper motor. The transmission assembly transmits the power from the motor to the blocking plate assembly 300 to drive the blocking plate assembly 300 to rotate, thereby controlling the opening and closing degree of the opening portion 101, and thereby controlling the amount of cold air passing through the cold air passage. The driving module is located within the driving chamber, as shown in FIG. 6.

2. Heater

The ventilation door device 10 may further include a heater H. According to the solution of the present disclosure, the heater H is installed to the end plate 103 of the frame 100 and at least partially surrounds the opening portion 101. For example, the shape of the heater H may at least partially match the shape of the end plate 103. For example, FIG. 1 shows the installation of the heater H in the frame 100. Since the opening portion 101 shown is rectangular and the end plate 103 is also rectangular, the heater H is a rectangle ring arranged around the opening portion 101.

According to an exemplary solution, the frame 100 further includes an edge plate 104 extending from the outer edge of the end plate 103, which partially surrounds the heater H. The extension direction of the edge plate 104 is the same as the extension direction of the housing engagement portion 107, and both extend away from the opening from the side of the opening portion 101 where the blocking plate assembly 300 is installed. For example, referring to the embodiment shown in FIG. 1. Thus, the heater H is surrounded by the edge plate 104 at its three edges, and is joined by the housing engagement portion 107 of the frame 100 at the other edge, so that the four edges of the heater H are restricted and protected. Through such structural arrangement of the frame 100, the heater H can be prevented from being crushed by external parts, and the heater H can be protected. At the same time, easy operation and compact installation of the heater H become possible.

Although the figures show that the heater is arranged on the side of the end plate close to the opening direction of the blocking plate assembly, according to another exemplary solution, the heater may be arranged on the back of the end plate, that is, on the side of the end plate away from the opening direction of the blocking plate assembly. For the solution in which the heater is arranged on the back of the end plate, for example, a groove surrounding the opening may be formed on the back of the end plate, and the heater may be arranged in the groove. Through such solution, a compact space arrangement can be realized, and the heater can be also protected.

The ventilation door device 10 is configured to generate an electrical signal when the blocking plate assembly 300 is in the closed position or the open position; and not generate an electrical signal or generate another electrical signal when the blocking plate assembly 300 is in a middle position between the closed position and the open position. The ventilation door device 10 is configured to monitor the signals, and if the ventilation door device 10 does not detect the disappearance of said electrical signal or does not detect the transform from said electrical signal to said another electrical signal within a predetermined time period after receiving the command to rotate the blocking plate assembly 300, the heater H will be activated. For example, the predetermined time period may be 3 to 8 seconds. In an exemplary embodiment, when the blocking plate assembly 300 is in the closed position or the open position, an electrical signal “1” is generated; and when the blocking plate assembly 300 is in a middle position between the closed position and the open position, an electrical signal “0” is generated. The ventilation door device 10 is configured to monitor the signals, and if the ventilation door device 10 does not detect a signal change within a predetermined time after receiving the command to rotate the blocking plate assembly 300, the heater H is activated.

Through this kind of control, when the stepper motor is driven to open the ventilation door, if the electrical signal change can be detected, it indicates that the door is not frozen and can be normally opened; and if the electrical signal change cannot be detected, it indicates the door might be frozen due to frost, then the heater H is activated to melt the frost and return the blocking plate 301 back to normal opening. In this way, it is avoided that the ventilation door freezes in the fully open or fully closed position and could not normally work due to frost or icing.

The above heating solution can be specifically realized by using a micro switch 409. The micro switch 409 can be arranged in the driving chamber, for example, on a circuit board located in the driving chamber. One of the transmission components of the driving module, such as the teeth missing gear described in detail below, may include two contacts 446 protruding in the radial direction. By setting the installation position of the teeth missing gear, when the blocking plate assembly 300 is in the closed position, a contact 446 triggers a static contact of the micro switch 409, so that the micro switch 409 generates an electrical signal, and when the blocking plate assembly 300 is in the open position, another contact 446 triggers the static contact of the micro switch 409, so that the micro switch 409 also generates an electrical signal; and when the blocking plate assembly 300 is in a middle position between the closed position and the open position, no contact 446 contacts the static contact of the micro switch 409, and the micro switch 409 does not generate any electrical signal or generates another electrical signal.

The heater H may be electrically connected to the circuit board. More about the circuit board will be introduced below. For example, the frame 100 includes a wiring portion 105, which is in the form of a groove formed in the frame 100, and can extend from a position of the housing engagement portion 107 of the frame 100 close to the end plate 103 to a position near the mounting position of the circuit board of the frame 100. For example, FIGS. 1-3 show the arrangement of the wiring portion 105 in the housing engagement potion 107 of the frame 100. The wires of the heater H for connecting to the circuit board are arranged along the wiring portion 105.

3. Circuit Board

Figure 7:
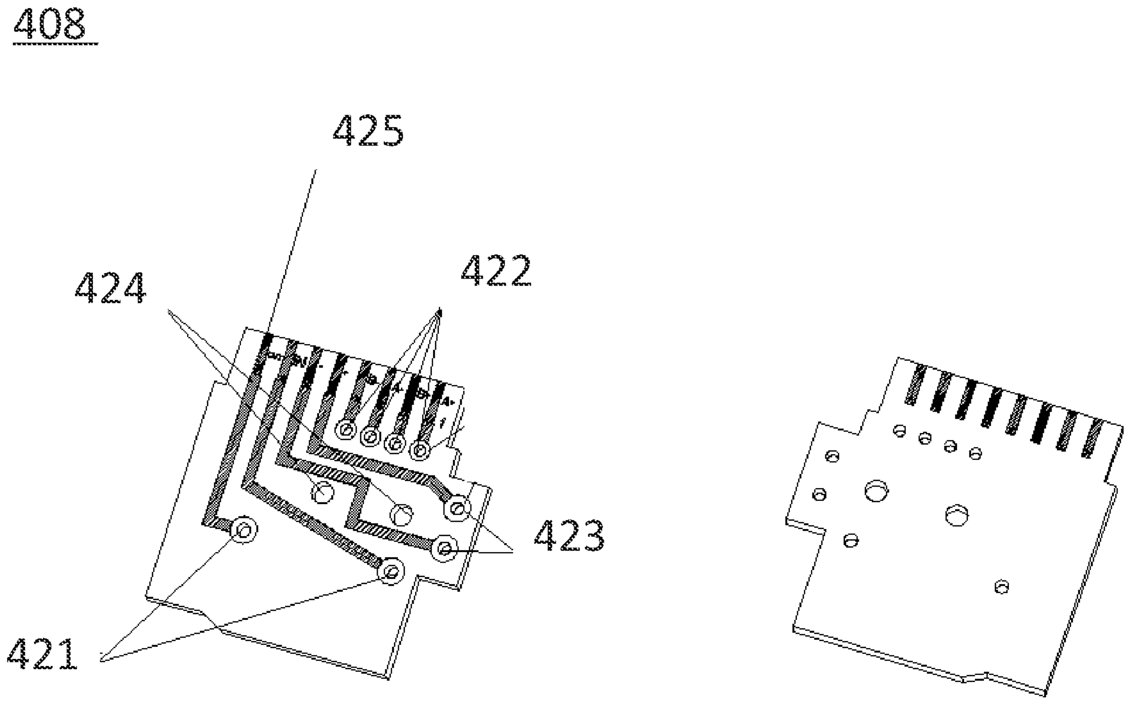
FIG. 7 shows a circuit board of the ventilation door device according to an exemplary embodiment.

As mentioned above, the ventilation door device 10 may also include a circuit board. FIG. 7 shows an example implementation of the circuit board. The circuit board can be used to control the motor, the heater H, and the micro switch 409.

According to an exemplary solution, the circuit board has coupling parts for the heater H, the driving module (specifically, the motor of the driving module), and the like. In the embodiment shown in the drawings, the circuit board includes a first coupling portion 421 for coupling the micro switch 409, a second coupling portion 422 for coupling the driving module, and a third coupling portion 423 for coupling the heater H. In addition, the circuit board has a motor limiting portion 424 for limiting the position of the stepper motor, which is in the form of holes formed in the circuit board.

In order to facilitate the installation of the circuit board, the frame 100 is provided with, for example, a slot portion 416 into which the circuit board is inserted. The slot portion 416 may be provided on the side of the housing engagement portion 107 of the frame 100 facing the driving chamber, so that the circuit board is arranged in the driving chamber. As best shown in FIG. 6, it shows the layout of the circuit board in the drive chamber.

According to an exemplary solution, the circuit board is provided with tin-plated holes penetrating the circuit board, so that when one side of the circuit board fails, the other side can still work to ensure the energizing of the circuit.

4. Driving Module

The driving module 400 of the ventilation door device 10 is used to drive the blocking plate 301 to rotate between the fully opened state shown in FIG. 1 and the fully closed state shown in FIG. 2. The components of the driving module 400 are accommodated in a driving chamber surrounded by the housing 200 and the frame 100.

Figure 8:
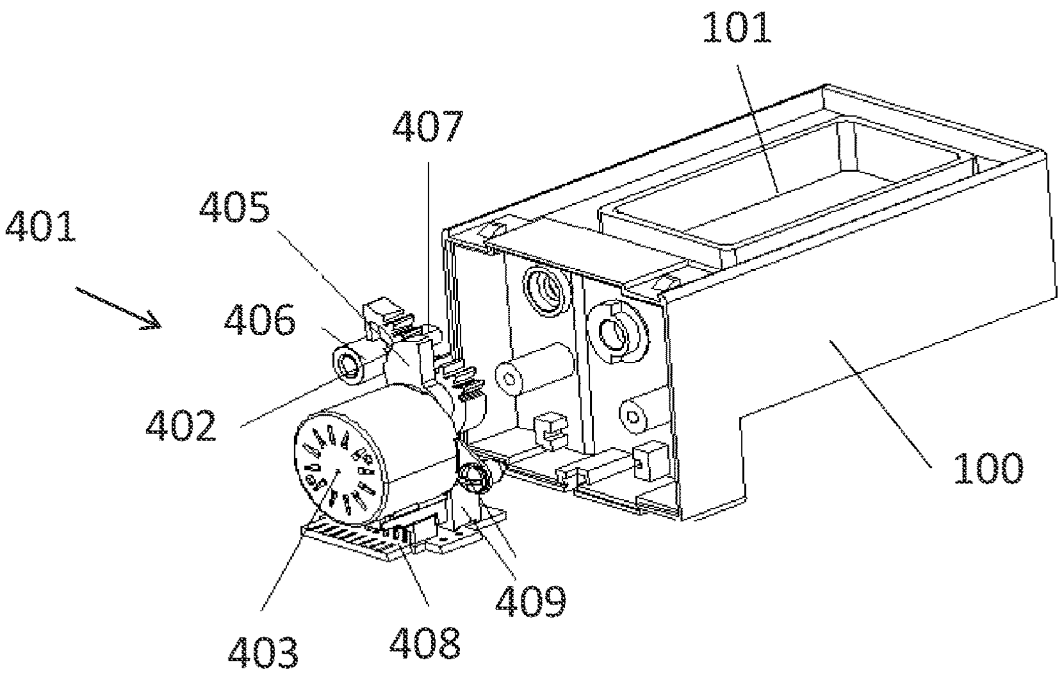
FIG. 8 shows an explanatory diagram of a driving module and a frame according to an exemplary embodiment.

In FIG. 8, the housing 200 is removed, and the components of the driving module 400 are shown. The driving module 400 includes a transmission assembly 402 and a stepper motor 403. The transmission assembly 402 includes a teeth missing gear 405 directly connected to the motor output shaft 404 of the stepper motor 403 and a sector gear 406 meshing with the teeth missing gear 405 and directly connected to an output shaft 407. The output shaft 407 is connected to the blocking plate 301. By driving the motor rotate positively or reversely, the blocking plate 301 can be driven to rotate positively or reversely to realize the opening or closing action of the ventilation door.

Figure 9:
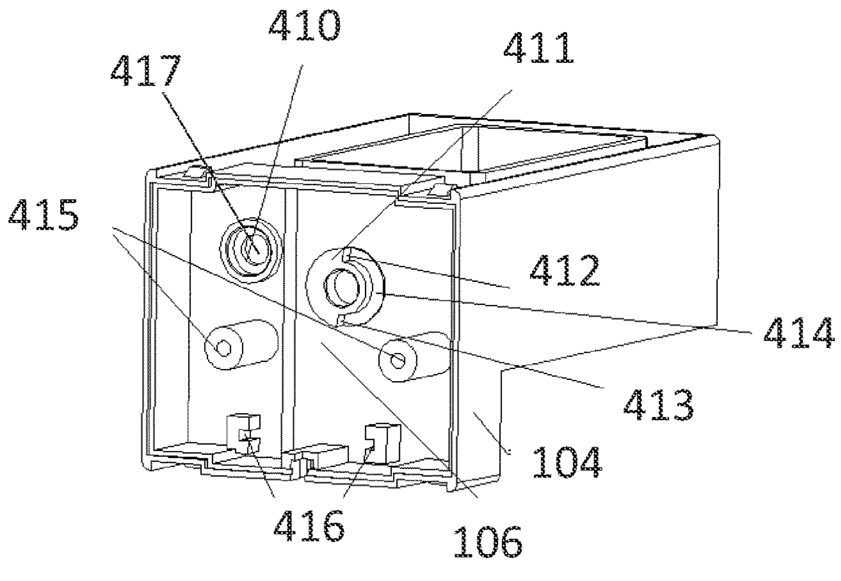
FIG. 9 shows an explanatory diagram of a frame according to an exemplary embodiment.

FIG. 9 shows the frame 100. The frame 100 has a bottom plate portion 106 facing the housing 200, and a structure for mounting and supporting various components of the driving module 400 is provided thereon. The bottom plate portion 106 is an integral part of the housing engagement portion 107 constituting the frame.

Referring to FIG. 9, the bottom plate portion 106 has a first cylindrical portion 410 for rotatably supporting the sector gear 406. The first cylindrical portion 410 protrudes from the plane of the bottom plate portion 106 toward the housing 200. The inner surface of the first cylindrical portion 410 defines a rotation support surface. Inside the first cylinder portion 410, a through hole 417 is formed through the bottom plate portion 106 for passing the output shaft 407 therethrough.

Figure 10:
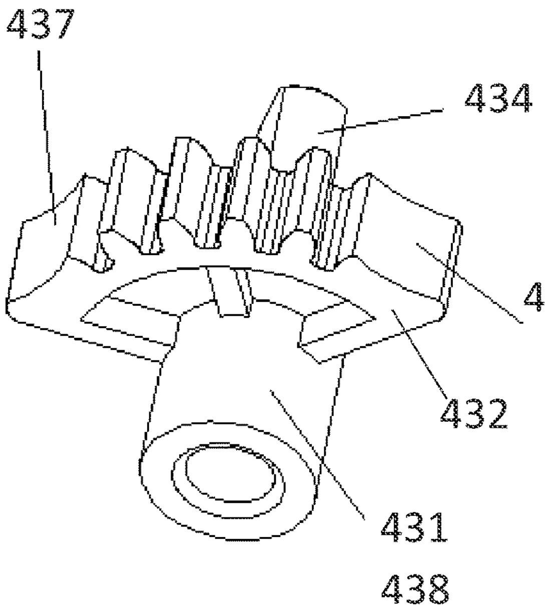
FIGS. 10 and 11A show explanatory diagrams of different angles of a sector gear according to an exemplary embodiment.
Figure 11A:
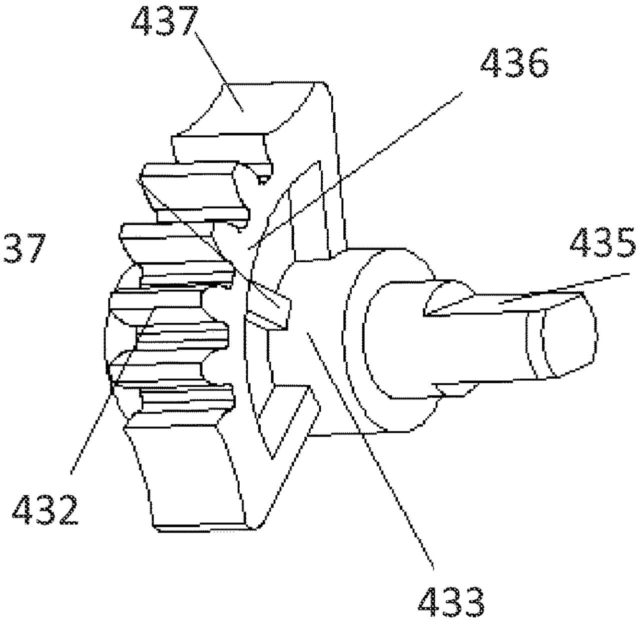
Figure 11B:
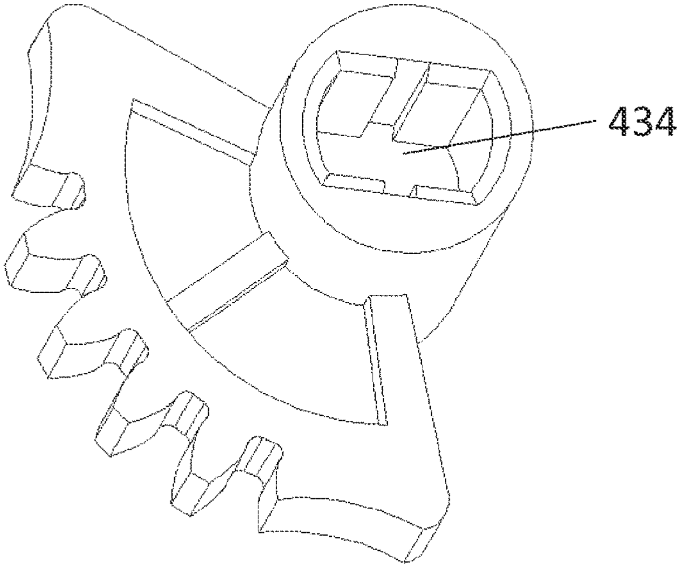
FIG. 11B shows an explanatory view of a sector gear according to another exemplary embodiment.

The structure of the sector gear 406 according to an exemplary embodiment is shown in FIGS. 10 and 11A. Along the axial direction, the sector gear 406 sequentially includes a shaft portion 431, a gear teeth portion 432, a cylindrical portion 433, and a sector gear output portion 434. The sector gear output portion 434 may be in the form of a rotating shaft and used as the output shaft 407 of the driving module 400. The shaft is used for inserting into a clamping structure in the form of a clamping slot disposed at the first shaft portion 305 of the blocking plate 301, as shown in FIG. 4A. In another embodiment, as shown in FIG. 11B, the sector gear output portion 434 may be in the form of a clamping slot for receiving and engaging a clamping structure in the form of a rotating shaft disposed at the first shaft portion 305 of the blocking plate 301, As shown in FIG. 4B. The shaft portion 431 may be installed on a corresponding supporting structure (not shown) inside the housing 200. The gear teeth portion 432 is sector shaped, and has a plurality of gear teeth on its outer peripheral side for meshing with the corresponding plurality of gear teeth of the upstream teeth missing gear 405. The cylindrical portion 433 can be coaxially inserted into the cavity of the first cylindrical portion 410 so that the outer circumferential surface of the cylindrical portion 433 is rotatably supported on the rotation supporting surface defined by the inner surface of the first cylindrical portion 410. At the same time, the sector gear output portion 434 in the form of a rotating shaft can pass through the through hole 417 to partially extend to the other side of the bottom plate portion 106. The sector gear output part 434 has a bonding structure, for example, two flat plans 435 as shown in FIGS. 11A and 11B, for engaging with an engagement hole at the first shaft portion 305 of the blocking plate 301.

Continuing to refer to FIG. 9, the bottom plate portion 106 has a second cylindrical portion 411 for rotatably supporting the teeth missing gear 405. The second cylindrical portion 411 protrudes from the plane of the bottom plate portion 106 toward the housing 200, and the inner surface of the second cylindrical portion 411 defines a rotation supporting surface. In addition, an arc groove 414 is provided on the outer circumference of the second cylindrical portion 411, and the arc groove 414 is recessed away from the end surface of the second cylindrical portion 411. The center of the arc groove 414 coincides with the axis of the second cylindrical portion 411. The arc groove 414 is used to guide the rotation of the teeth missing gear 405 and limit the angular range of the rotation. The arc groove 414 has two end surfaces, including a first limit surface 412 corresponding to the open position of the ventilation door and a second limit surface 413 corresponding to the closed position of the ventilation door. The arc groove 414 extends between the two limit surfaces 412, 413.

Figure 12:
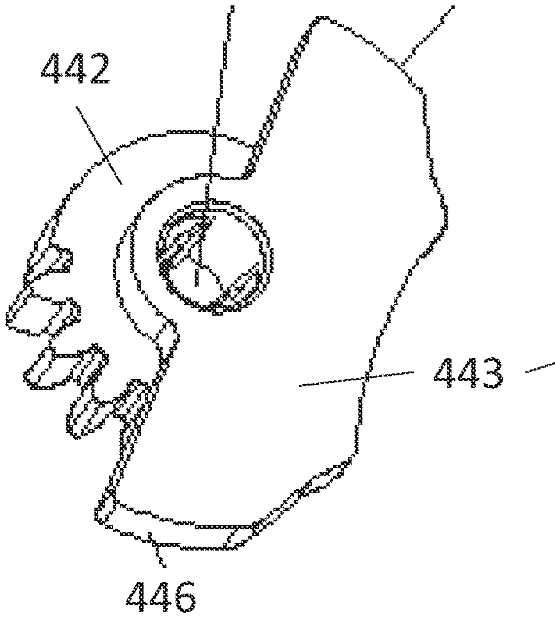
FIGS. 12 and 13 show explanatory diagrams of different angles of a teeth missing gear according to an exemplary embodiment.
Figure 13:
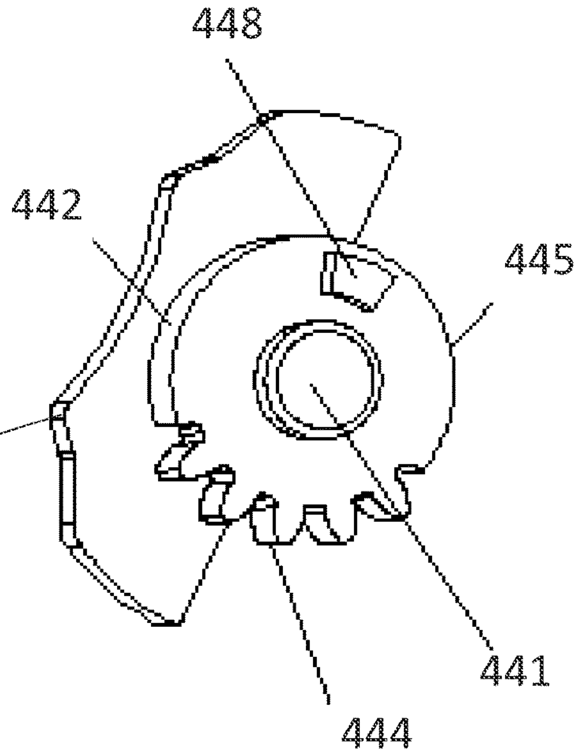

The structure of the teeth missing gear 405 according to an exemplary embodiment is shown in FIGS. 12 and 13. Along the axial direction, the teeth missing gear 405 includes a shaft portion 441, a gear teeth portion 442, and a contact portion 443 in sequence. The shaft portion 441 can be coaxially inserted into the inside of the second cylindrical portion 411 so that the outer peripheral surface of the shaft portion 441 is rotatably supported on the rotation supporting surface of the inner periphery of the second cylindrical portion 411. The outer periphery of the gear teeth portion 442 is divided into two different sections. The first section has gear teeth and is a gear teeth section 444, and the second section does not have gear teeth and is an arc section 445. The multiple gear teeth on the gear teeth section 444 are used to mesh with the corresponding multiple gear teeth on the downstream sector gear 406. The contact portion 443 has two arms extending away from the axis, and the end of each arm forms a contact 446 for actuating the micro switch 409. Each contact 446 forms the part on the contact portion 443 being furthest away from the axis. Therefore, during the rotation of the teeth missing gear 405, only the contact 446 will touch the static contact on the micro switch 409. In addition, during the rotation of the teeth missing gear 405, except for the contact 446 touching the static contact on the micro switch 409, the teeth missing gear 405 will not interfere with any other structures. At a position adjacent to the axis of the contact portion 443, a shaft hole 447 is formed, and the shaft hole 447 can be firmly connected to the motor output shaft 404.

As shown in FIG. 13, an arc-shaped protrusion 448 is provided on the surface of the gear teeth portion 442 facing the shaft portion 441. When the shaft portion 441 is inserted into the inside of the second cylindrical portion 411, the arc-shaped protrusion 448 will be inserted into the arc groove 414 of the second cylindrical portion 411. Thus, while the stepper motor 403 drives the teeth missing gear 405 to rotate, the arc-shaped protrusion 448 will move along the arc groove 414 until the two limit surfaces 412 and 413 of the arc groove 414 abut the arc-shaped protrusion 448, so as to prevent the tooth missing gear 405 from rotating, thereby playing a position limiting role.

Return to refer to FIG. 9, the bottom plate portion 106 also has a supporting portion 415 for fixing the mounting structure of the stepper motor 403 by screws, so as to mount the stepper motor 403 to the frame 100. The bottom plate portion 106 also has a slot portion 416 for clamping and fixing the circuit board 408.

The working mechanism of the driving module 400 of the present disclosure is as follows:

- when opening the ventilation door device, the stepper motor 403 rotates the teeth missing gear 405 counterclockwise (viewed from left to right in FIG. 8), and then drives the blocking plate 301 to rotate clockwise via the sector gear 406; when the arc-shaped protrusion 448 of the teeth missing gear 405 abuts the first limiting surface 412, the blocking plate 301 stops rotating, and reaches the open position at this time, and the opening portion 101 of the frame 100 is opened to allow the cooling air flow to flow therethrough; at this time, the contact 446 of the teeth missing gear 405 touches the static contact on the micro switch 409, and the micro switch 409 outputs a corresponding electrical signal, indicating that the ventilation door device is fully opened; and
- when closing the ventilation door device, the stepper motor 403 rotates the teeth missing gear 405 clockwise, and then drives the blocking plate 301 to rotate counterclockwise via the sector gear 406; when the elastic component 302 on the blocking plate 301 abuts against the sealing portion 102 on the frame 100, the blocking plate 301 stops rotating and reaches the closed position at this time, closing the opening portion 101 of the frame 100, and blocking the flow of cooling air; at this time, the other contact 446 of the teeth missing gear 405 touches the static contact on the micro switch 409, and the micro switch 409 outputs the corresponding electrical signal, indicating that the ventilation door device is completely closed.

The contacts 446 cooperate with the static contact on the micro switch 409 to provide electrical signal feedback. In an exemplary embodiment, when the blocking plate 301 is fully opened or fully closed, an electrical signal is output (e.g., the output signal "1"); and during the rotation of the blocking plate 301, no electrical signal is output (e.g., the output signal "0"). When driving the stepper motor to open the ventilation door, if the electrical signal change can be detected, it indicates that the ventilation door is not frozen and is opened normally; and if the electrical signal change cannot be detected, it indicates that the ventilation door may be frozen due to frost. The heating function can then be activated to melt the frost and make the blocking plate 301 return to normal.

5. Locking Mechanisms

In order to prevent the blocking plate 301 from rotating in the opening direction due to rebound of the elastic component 302, air flowing, vibration, etc., after reaching the closed position, the driving module 400 may be provided with a locking mechanism. The present disclosure provides the following two different locking structures, namely, an arc-shaped locking structure (FIGS. 10 to 13) and a tooth-shaped locking structure (FIGS. 14 to 25).

5.1 Arc-Shaped Locking Structure

In the first embodiment, the locking mechanism is composed of a concave locking arc 437 of the sector gear 406 and the arc section 445 of the teeth missing gear 405. As shown in FIGS. 10, 11A and 11B, on the outer periphery of the gear teeth portion 432 of the sector gear 406, there is a gear teeth section 436 including a plurality of gear teeth, and two concave locking arcs 437 located at both ends of the gear teeth section 436 in the circumferential direction. Each concave locking arc 437 is recessed toward the center of the sector gear 406 and has a circular arc shape. During driving the blocking plate 301 to rotate, the gear teeth section 436 of the sector gear 406 meshes with the gear teeth section 444 of the missing gear 405.

Figure 14:
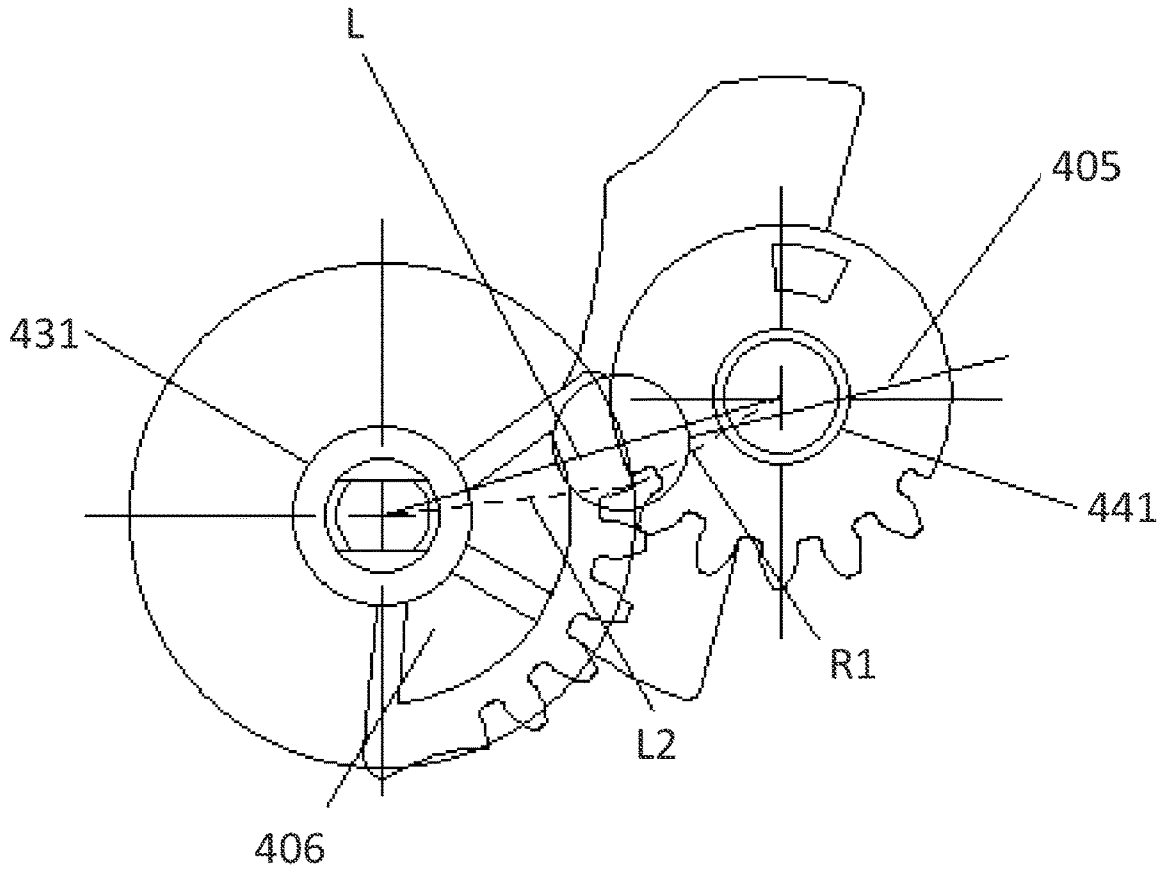
FIG. 14 shows a plan view of a sector gear and a teeth missing gear when the ventilation door is closed according to an exemplary embodiment.

When the blocking plate 301 is in the closed position, as shown in FIG. 14, the concave locking arc 437 engages part of the arc section 445 to form a concave-convex arcs locking structure. The curvature of the concave locking arc 437 is set to match the curvature of the arc section 445. In this configuration, if the teeth missing gear 405 remains fixed, the concave locking arc 437 will not rotate freely relative to the arc section 445, because part of the arc section 445 extends into the concave locking arc 437, which will provide a resistance to prevent the concave locking arc 437 from rotating over the arc section 445. It is precisely due to the locking mechanism of the concave locking arc 437 and the arc section 445 that the sector gear 406 and the blocking plate 301 coupled with it will be stably kept in the closed position and will not be easily displaced. The pushing force toward the blocking plate 301 due to the rebound effect of the elastic component 302 and the airflow, vibration and other factors will not cause the blocking plate 301 to move toward the open position, which improves the airtightness of the closing of the ventilation door, and also reduces the noise problem caused by the shaking of the blocking plate 301.

Figure 15:
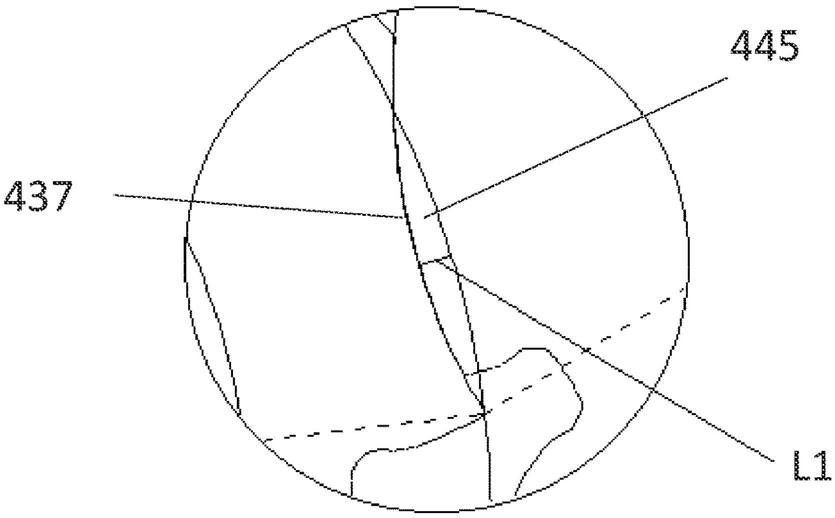
FIG. 15 shows an enlarged view of the circular area in FIG. 14.

FIG. 14 and its partial enlargement FIG. 15 show the structure of the teeth missing gear 405 and the sector gear 406 in the locked state. The radius of the arc section 445 of the teeth missing gear 405 is R1, the distance from the arc end points of the concave locking arc 437 of the sector gear 406 to the center of the sector gear 406 is L2, and the distance between the centers of the sector gear 406 and the teeth missing gear 405 is L. In order to achieve the above locking effect, L is less than R1+L2, and the difference between the (R1+L2) and L is the interference amount L1. The interference amount L1 can be 0.05 mm≤L1≤1 mm. When interference amount L1 is greater than 1 mm, there will be interference in the gears due to space design issues; due to factors such as parts manufacturing tolerance, the interference amount L1 is greater than or equal to 0.05 mm. When the interference amount L1 is less than 0.05 mm, the locking mechanism does not work. In addition, the size constraints of the shafts need to be considered. The radius of the shaft 441 of the teeth missing gear 405 is r1, the radius of the shaft 431 of the sector gear 406 is r2, and the radius of the arc section 445 of the teeth missing gear 305 is R1, which has the following range: r1≤R1≤L−r2. The distance between the arc end points of the concave locking arc 437 of the sector gear 306 and the center of the sector gear 306 is L2, which has the following range: r2≤L2≤L−r1.

In addition to the locking function, this locking structure also has the function of allowing the teeth missing gears to idle and shortening the locked-rotation time of the stepper motor when the door is closed.

In this solution, when the blocking plate 301 is closed in place, that is, when the elastic component 302 abuts against the sealing portion 102 of the frame 100 and is elastically deformed, the second limit surface 413 of the circular arc groove 414 of the housing 200 and arc-shaped protrusion 448 of the teeth missing gear 405 has not yet abutted. Then, the arc section 445 of the teeth missing gear 405 has entered the concave locking arc 437 of the sector gear 406, but it can still continue rotate forward relative to the concave locking arc 437 (at this time, the stepper motor 403 is idling, that is, the blocking plate 301 is not driven to further rotate) until the second limit surface 413 abuts the arc-shaped protrusion 448, and finally the stepper motor 403 is prevented from rotating. The angle at which the teeth missing gear 405 can continue to rotate is referred as idling angle α.

Figure 16:
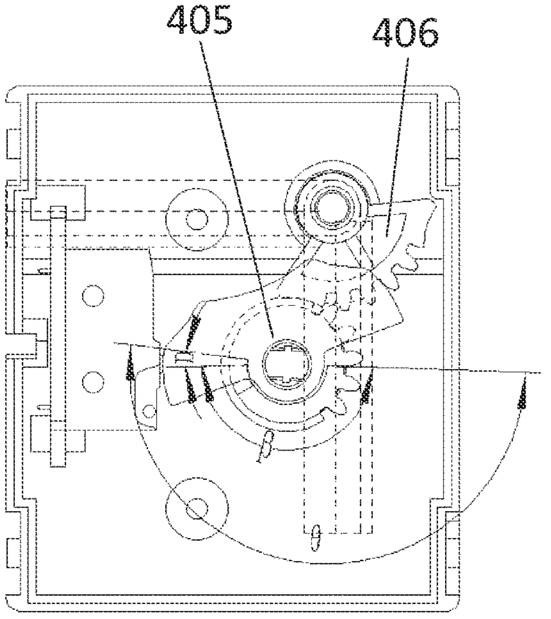
FIGS. 16 and 17 show a perspective view and a side view of the ventilation door device when it is closed.
Figure 17:
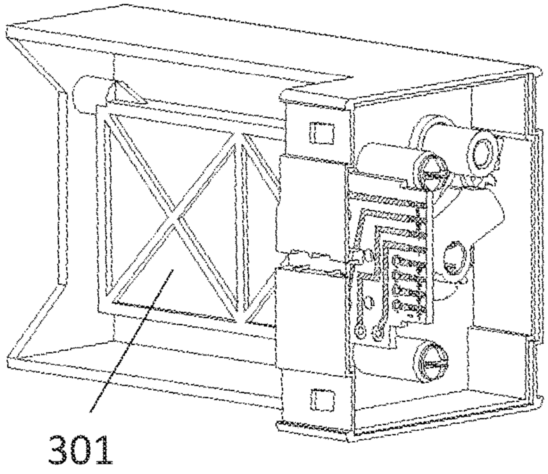
Figure 18:
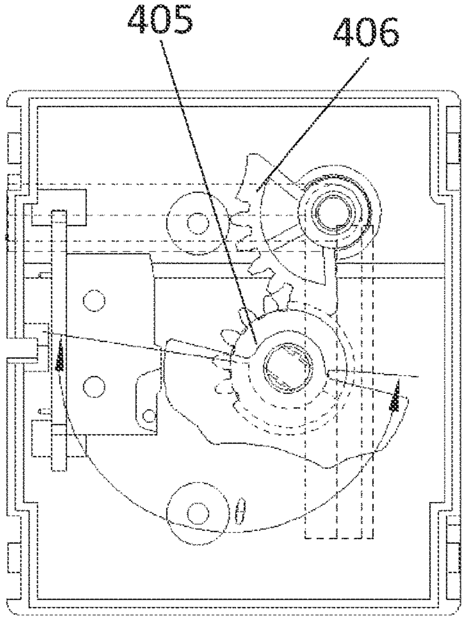
FIGS. 18 and 19 show a perspective view and a side view of the ventilation door device when it is opened.
Figure 19:
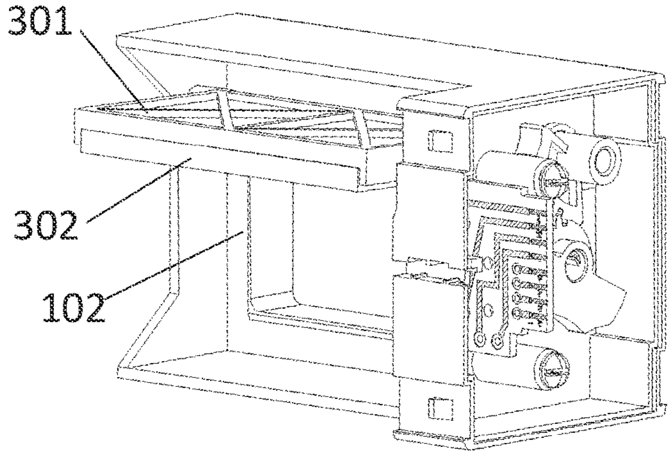

FIG. 16 is a schematic diagram of the sector gear 406 and the teeth missing gear 405 when the blocking plate 301 is completely closed (as shown in FIG. 17). FIG. 18 is a schematic diagram of the sector gear 406 and the teeth missing gear 405 when the blocking plate 301 is fully opened (as shown in FIG. 19). As shown in the figures, θ is the total angle that the stepper motor 403 drives the teeth missing gear 405 to rotate (that is, the angle from the first limit surface 412 to the second limit surface 413), α is the idling angle, and β is the angle across which the teeth missing gear 405 rotates when the ventilation door rotates from the open position to the closed position. These angles have the following relation: θ=α+β.

During closing the door, it is necessary to design the stepper motor 403 to stall. The purpose of stalling is to reset the gears of the stepper motor 403 to zero position, so that the ventilation door 301 can return to the same position when the door is closed in the next round. The, the tolerance of the gear rotation is eliminated, so that the ventilation door is closed more accurately, and the opening portion 101 is more reliably closed by the blocking plate 301. If the pulse number for opening rotation of the stepper motor 403 set by the client is M and the pulse number for closing is N, then N−M=W, W is the pulse number of the stepper motor for minimum stalling, and A is the idling pulse number of the stepper motor.

The inventor found that if the overall angle θ that the stepper motor 403 drives the teeth missing gear 406 to rotate is equal to the rotation angle β of the teeth missing gear 406 required for the blocking plate 301 to close in place, after the ventilation door is closed in place, if it needs to complete the pulse number N desired by the motor, the pulse number of the stepper motor 403 that needs to be stalled is W+A. If the stalling time is too long, it will cause the risk of gear breakage. For this reason, in the solution of the present disclosure, the idling angle α is increased by the above-mentioned locking mechanism, so that the arc-shaped protrusion 448 of the teeth missing gear 405 idles for a certain number of pulse steps before reaching the second limit surface 413. This shortens the blocking time and reduces the risk of tooth breakage.

5.2 Tooth-Shaped Locking Structure

In the second embodiment, the locking mechanism is composed of the first tooth 451 and the second tooth 452 at the end of the sector gear 406', and the arc section 445' of the teeth missing gear 405'.

Figure 20:
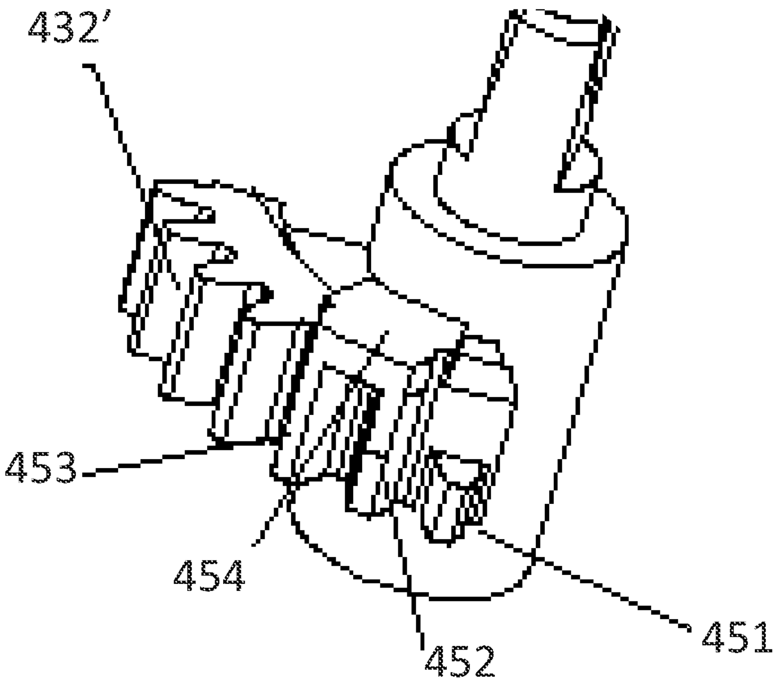
FIG. 20 shows an explanatory view of a sector gear according to another exemplary embodiment.

Referring to FIG. 20, the structure of the sector gear 406' in the second embodiment is basically the same as the structure of the sector gear 406 in the first embodiment, and only the differences between the two are described below. No concave locking arc is disposed at the two sides of the gear teeth portion 432' of the sector gear 406'. On the contrary, the gear teeth portion 432' has a first tooth 451, a second gear 452, and a third tooth 453 in sequence on one side (the side is the last to mesh when the ventilation door is closed, and the first to mesh when the ventilation door is opened). The first tooth 451 is located nearest to the end. As shown in FIG. 20, the width of the first tooth 451 in the axial direction is shorter relative to the other teeth, so that the end surface of the first tooth 451 facing the sector gear output portion 434' is farther away from the output shaft than the other teeth. In addition, the second tooth 452 and the third tooth 453 are connected by a connecting portion 454 on the side close to the output portion 434' of the sector gear.

Figure 21:
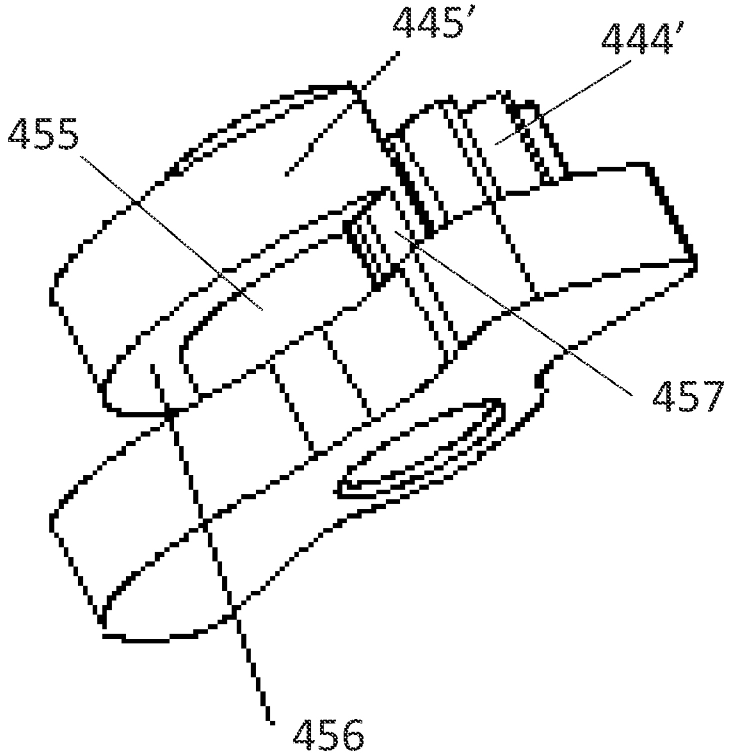
FIG. 21 shows an explanatory view of a teeth missing gear according to another exemplary embodiment.

Referring to FIG. 21, the structure of the teeth missing gear 405' in the second embodiment is basically the same as the structure of the teeth missing gear 405 in the first embodiment, and only the difference between the two will be described below. An arc-shaped groove 455 is formed between the arc section 445' and the contact portion 443' of the teeth missing gear 405', which is located between the inner surface 456 of the arc section 445' and the side surface of the contact portion 443'. The two ends of the arc-shaped groove 455 each extend to the outer surfaces of the two outermost teeth of the gear teeth section 444'. The radial depth of the arc-shaped groove 455 is greater than the radial height of the first tooth 451, and the axial width of the arc-shaped groove 455 is greater than the axial width of the first tooth 415. Thus, the first tooth 451 can be received in the arc-shaped groove 455 and slide along the arc-shaped groove 455.

Figure 22:
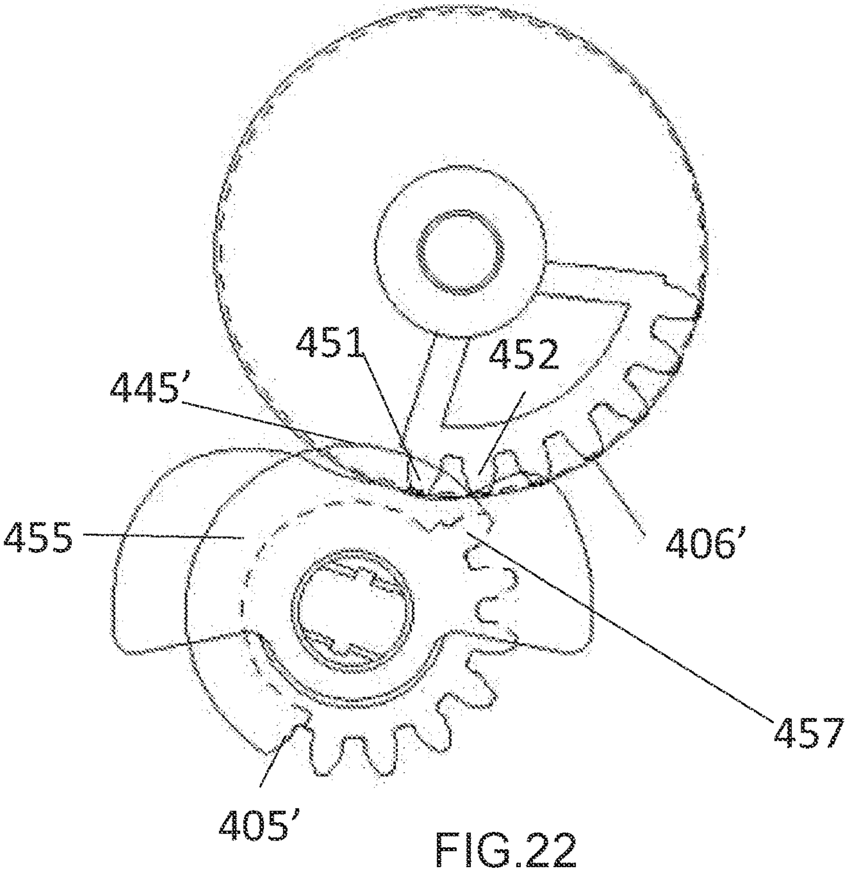
FIGS. 22 and 23 show a plan view and an explanatory view of the sector gear and the teeth missing gear when the ventilation door device is closed according to another exemplary embodiment.
Figure 23:
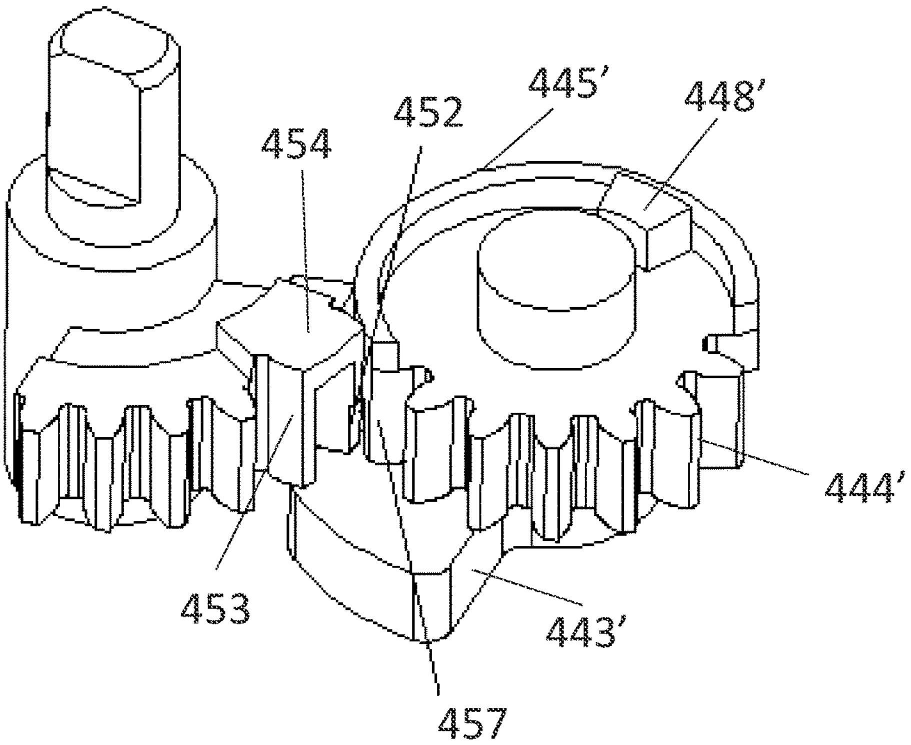

When the blocking plate 301 is in the closed position, as shown in FIGS. 22 and 23, part of the outer surface of the arc section 445' of the teeth missing gear 405' enters the space between the first teeth 451 and the second teeth 452 of the sector gear 406'. The second tooth 452 abuts the outer surface of the arc section 445'. Since the first tooth 451 is offset from the arc section 445' in the axial direction, the first tooth 451 will not block the arc section 445' from entering the space between the first tooth 451 and the second tooth 452, and the first tooth 451 will be accommodated by the arc-shaped groove 455.

In this configuration, on the one hand, the arc section 445' of the teeth missing gear 405' can continue to rotate over a certain angle relative to the second tooth 452 of the sector gear 406' after the blocking plate 301 reaches the closed position, achieving idling of the teeth missing gear 405' and the stepper motor 403, until the arc-shaped protrusion 448' on the teeth missing gear 405' abuts the corresponding second limit surface 413, which helps to shorten the stalling time of the stepper motor.

On the other hand, since the outer surface of the arc section 445' abuts against the second tooth 452, the sector gear 406' can be prevented from rotating in the direction of opening the ventilation door. Then, the ventilation door can be prevented from opening due to the rebound of the elastic element 302 on the blocking plate 301, the impact of the airflow or the vibration. Then, the tightness of the closed door could be improved. In addition, the tops of the second tooth 452 and the third tooth 453 of the sector gear 406' are connected by the connecting portion 454. This structure can increase the strength of the gear and increase the contact area of the second tooth 452, thereby effectively avoiding tooth breakage due to the impact when the arc section 445' of the teeth missing gear 405' abuts against the second tooth 452 of the sector gear 406'.

The above structure might have noise problem when opening and closing the ventilation door. For example, referring to FIG. 22, when opening ventilation door, the stepper motor 403 drives the teeth missing gear 405' to rotate counterclockwise, the first tooth 457 of the teeth missing gear 405' will cross over the second tooth 452 of the sector gear 406', and mesh between the first tooth 451 and the second tooth 452. At this time, due to factors such as the force acting on the sector gear 406' from the side of the ventilation door and manufacturing tolerances, the rotation center axis of the sector gear 406' may be inclined. In such case, the second tooth 452 of the sector gear 406' is likely to interfere with the inner surface 456 of the arc section 445' and the first tooth 457 of the teeth missing gear 405', thereby causing noise. The situation is similar when closing the ventilation door.

In order to relieve such noise phenomenon, the structure of the present disclosure can be improved in any of the following ways.

Figure 24:
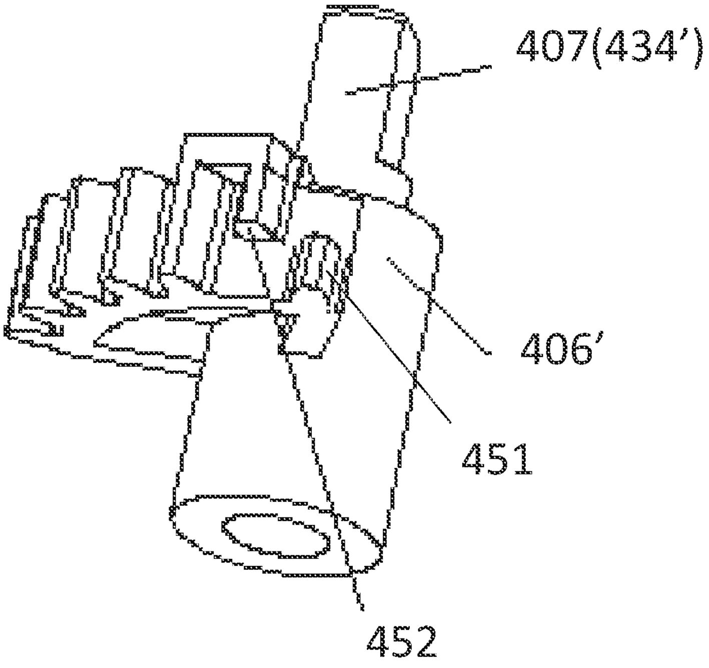
FIG. 24 shows an explanatory diagram of a sector gear according to still another exemplary embodiment.
Figure 25:
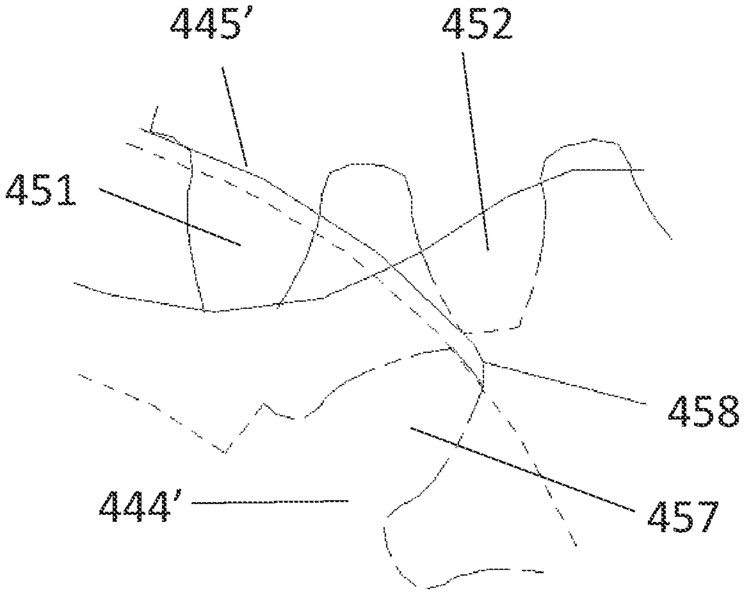
FIG. 25 shows a partial schematic diagram of a sector gear and a teeth missing gear according to still another exemplary embodiment.

- The radius of the addendum circle of part of the second tooth 452 of the sector gear 406' is set smaller than that of the normal tooth, as shown in FIGS. 22 and 23. Portion of the second tooth 452 far away from the connecting potion 454 can be removed partially. In this case, when the rotation center axis of the sector gear 406' is inclined, the second tooth 452 of the sector gear 406' does not have a portion protruding toward the inner surface 456 of the arc section 445' of the teeth missing gear 405'. Then, there will be no interference and no noise will be generated.
- The end surface of the second tooth 452 of the sector gear 406' away from the connecting portion 454 and the inner surface 456 of the arc section 445' of the teeth missing gear 405' are set on the same plane, that is, the portion of the second tooth 452 below the inner surface 456 of the arc section 445' is completely cut off, as shown in FIG. 24. In this case, when the rotation center axis of the sector gear 406' is inclined, the second tooth 452 of the sector gear 406' does not have a portion protruding toward the inner surface 456 of the arc section 445' of the teeth missing gear 405'. Then, there will be no interference and no noise will be generated.
- The radius of the arc section 445' of the teeth missing gear 405' is set greater than the radius of the addendum circle of the gear teeth section 444', as shown in FIG. 25, wherein the dashed line is the addendum circle of the gear teeth section 444'. In this case, when the rotation center axis of the sector gear 406' is inclined and the arc section 445' abuts the second tooth 452 of the sector gear 406', the addendum position of the second tooth 452 will also be located outside the addendum circle of the teeth missing gear 405'. Therefore, when the teeth missing gear 405' and the sector gear 406' start to mesh, the first tooth 457 of the tooth-missing gear 405' and the second tooth 452 of the sector gear 406' will not interfere to generate noise. In addition, in this example, as shown in FIG. 25, the outer peripheral surface of the arc section 445' of the teeth missing gear 405' and the tooth surface of the first tooth 457 of the gear teeth section 444' are connected by an arc-shaped guide surface 458. Therefore, when the second tooth 452 of the sector gear 406' is in contact with the tooth surface of the first tooth 457 of the teeth missing gear 405', the second tooth 452 does not collide with a step, so that the generation of noise can be prevented or suppressed.

The ventilation door mechanism provided in the present disclosure can be used in various types of refrigerators. For example, a refrigerator includes one or more storage compartments. The refrigerator has one or more cold air passages leading to the one or more storage compartments, respectively. The opening portions of the ventilation door devices are respectively arranged in the corresponding cold air passages, so that the amount of cold air delivered in the corresponding cold air passages can be controlled by the opening and closing of the opening portions of the corresponding ventilation door devices.

Unless otherwise defined, the technical terms or scientific terms used herein shall have the usual meanings understood by those with ordinary skills in the field to which this disclosure belongs. The "first", "second" and similar words used in the description and claims of this disclosure do not denote any order, quantity or importance, but are only used to distinguish different components. Similarly, words such as "a", "an" or "one" do not necessarily indicate quantitative restrictions. "include" or "comprise" and other similar words mean that the element or item appearing before them covers the elements or items listed after them and their equivalents, but does not exclude other elements or items. Similar words such as "connect" or "couple" are not limited to physical or mechanical connections, but may include electrical connections, in both direct or indirect connections. "Upper", "lower", "left" and "right" are only used to indicate the relative position relationship. When the absolute position of the described object changes, the relative position relationship may also change accordingly.

The exemplary embodiments in the present disclosure are described in detail above. However, those skilled in the art can understand that, without departing from the concept of the present disclosure, there are many variations and modifications to the embodiments, and various technical features and structures in the present disclosure can be combined in various ways without exceeding the protection scope of the present disclosure, which is determined by the appended claims.

The invention claimed is:

1. A ventilation door device for a refrigerator, including:

a frame having an end plate provided with an opening portion, and having a blocking plate assembly rotatably mounted to the end plate, the blocking plate assembly is able to rotate between a closed position where the opening portion is completely closed and an open position where the opening portion is completely open;

a housing engaging the frame and forming a driving chamber between the housing and the frame; and a driving module at least partially being held in the driving chamber and configured to drive the blocking plate assembly to rotate;

wherein the frame has a housing engagement portion located at the side edge of the end plate and extending substantially perpendicular to the end plate, and the housing is connected to the housing engagement portion of the frame;

wherein the blocking plate assembly includes a blocking plate to be installed on the end plate and an elastic component disposed on the blocking plate, when the blocking plate assembly is in the closed position, the elastic component abuts the frame and elastically deforms to seal the opening portion; and wherein the end plate of the frame has a sealing portion arranged around the opening portion and protruding from the end plate, and when the blocking plate assembly is in the closed position, the elastic component abuts the sealing portion of the frame, wherein the driving module comprises:

a stepper motor;

a teeth missing gear connected to the stepper motor;

a sector gear meshing with the teeth missing gear; and an output shaft connected to the sector gear and connected to the blocking plate;

wherein the stepper motor can drive the blocking plate to rotate via the teeth missing gear, the sector gear and the output shaft, wherein the outer periphery of the teeth missing gear has an arc section next to its teeth section; when the blocking plate is in the closed position, the outer surface of the arc section of the teeth missing gear abuts the sector gear, thereby preventing the sector gear from rotating in the direction of opening the blocking plate, and wherein the outer periphery of the sector gear has a concave locking arc next to its teeth section, and the concave locking arc is recessed toward the center of the sector gear; when the blocking plate is in the closed position, a part of the arc section enters the interior of the concave locking arc, preventing the concave locking arc from rotating relative to the arc section, thereby the teeth missing gear prevents the sector gear from rotating in the direction of opening the blocking plate.

2. The ventilation door device according to claim 1, further comprising a heater (H) installed to the end plate and at least partially surrounding the opening portion;

wherein the frame further includes an edge plate extending from the outer edge of the end plate, and the edge plate surrounds the heater, and wherein the shape of the heater at least partially matches the shape of the end plate.

3. The ventilation door device according to claim 2, wherein the ventilation door device is configured to generate an electrical signal when the blocking plate assembly is in the closed position or the open position, and when the blocking plate assembly is in a middle position between the closed position and the open position, no electrical signal is generated, or another electrical signal is generated; and wherein the ventilation door device is configured to activate the heater if the disappearance of said electrical signal or the change from said electrical signal to said another electrical signal is not detected within a predetermined time after receiving a command to rotate the blocking plate assembly.

4. The ventilation door device according to claim 3, further comprises a micro switch, and a transmission gear in the driving module includes two contacts extending radially from said transmission gear, wherein the micro switch and the transmission gear are designed as follows:

when the blocking plate assembly is in the closed position, one of the two contacts triggers a static contact of the micro switch, so that the micro switch generates the electrical signal;

when the blocking plate assembly is in the open position, the other of the two contacts triggers the static contact of the micro switch, so that the micro switch generates the electricity signal; and when the blocking plate assembly is in the middle position between the closed position and the open position, neither of the two contacts triggers the static contact of the micro switch, so that the micro switch does not generate the electrical signal or generates another electrical signal.

5. The ventilation door device according to claim 4, further comprises a circuit board, the circuit board having:

a first coupling portion for coupling the micro switch;

a second coupling portion for coupling the driving module; and a third coupling portion for coupling the heater.

6. The ventilation door device according to claim 1, wherein:

the sector gear includes a sector gear teeth portion, a cylindrical portion and a sector gear output portion which are sequentially arranged along an axial direction; and the teeth missing gear includes a shaft portion and a circular gear teeth portion, the circular gear teeth portion includes a gear teeth section with gear teeth and an arc section without gear teeth, and the gear teeth on the gear teeth section mesh with the gear teeth on the sector gear teeth portion.

7. The ventilation door device according to claim 6, wherein:

the frame has a bottom plate portion extending perpendicular to the plane where the opening portion is located, and the bottom plate portion includes:

a first cylindrical portion used to rotatably support the cylindrical portion of the sector gear inside the first cylindrical portion, a second cylinder portion used to rotatably support the shaft portion of the teeth missing gear inside the second cylinder portion; and wherein inside the first cylinder portion, the bottom plate portion has a through hole allowing the sector gear output portion passing through as the output shaft to extend to the blocking plate;

wherein the second cylindrical portion has an arc groove, and the arc groove is recessed away from the end surface of the second cylindrical portion, and the center of the arc groove coincides with the axis of the cylinder part, and the arc groove extends between two limiting surfaces; and wherein the teeth missing gear has an arc-shaped protrusion that protrudes from the side surface of the circular gear teeth portion of the teeth missing gear and is configured to be able to extend into the arc groove, and moves along the arc groove with the rotation of the teeth missing gear, any one of the two limiting surfaces is used to abut the arc-shaped protrusion to limit the rotation of the teeth missing gear.

8. The ventilation door device according to claim 6, wherein:

the ventilation door device further includes a micro switch with a static contact;

the teeth missing gear further includes a contact portion having two contacts;

when the blocking plate is in the open position, one of the two contacts engages the static contact of the micro switch, and the micro switch sends an electrical signal;

when the blocking plate is in the closed position, the other of the two contacts engages the static contact of the micro switch, and the micro switch sends the electrical signal;

when the blocking plate is in a middle position between the closed position and the open position, the contact portion does not engage the static contact of the micro switch, and the micro switch does not send the electrical signal or sends a different signal from said electrical signal.

9. The ventilation door device according to claim 8, wherein:

the contact portion is arranged on the side of the gear teeth portion of the teeth missing gear away from the shaft portion, and the contact portion has two arms extending radially outwardly, the end of each arm forms a contact, and each contact is located farther from the center of the teeth missing gear than the remaining portions of the contact portion.

10. The ventilation door device according to claim 1, wherein:

when the blocking plate is in the closed position, the distance between any point on the concave locking arc and the center of the teeth missing gear is greater than the radius of the arc section, so as to not block the arc section from rotating relative to the concave locking arc, thereby the teeth missing gear can idly rotate by an idling angle ($\alpha$) in the direction of closing the ventilation door.

11. The ventilation door device according to claim 10, wherein:

the frame has a second cylindrical portion that rotatably supports the teeth missing gear, and the second cylindrical portion has an arc groove, and the arc groove extends between two limiting surfaces;

the teeth missing gear has an arc-shaped protrusion configured to be able to extend the interior of the arc groove and move along the arc groove with the rotation of the teeth missing gear, until it abuts against any one of the two limiting surfaces; and wherein, the angle between the two limiting surfaces is a first angle, and the angle across which the teeth missing gear rotates when the blocking plate is driven to rotate from the open position to the closed position is a second angle ($\beta$), and the first angle ($\theta$) is equal to the sum of the second angle ($\beta$) and the idling angle ($\alpha$).

12. The ventilation door device according to claim 11, wherein:

the radius of the arc section of the teeth missing gear is R1, the distance from the arc end point of the concave locking arc of the sector gear to the center of the sector gear is L2, the distance between centers of the sector gear and the teeth missing gear is L, and wherein (R1+L2)−L is the amount of interference L1, and the range of the interference amount L1 is: 0.05 mm≤L1≤1 mm.

13. The ventilation door device according to claim 1, wherein the driving module comprises:

a stepper motor;

a teeth missing gear connected to the stepper motor, and the teeth missing gear includes an arc section without gear teeth;

a sector gear meshing with the teeth missing gear; and an output shaft connected to the sector gear and connected to the blocking plate;

wherein the stepper motor can drive the blocking plate to rotate via the teeth missing gear, the sector gear and the output shaft; and wherein when the blocking plate is in the closed position, a portion of the arc section of the teeth missing gear is located between two teeth of the sector gear, and the teeth missing gear prevents the sector gear from rotating in the direction of opening the shutter.

14. The ventilation door device according to claim 13, wherein:

the sector gear has a first tooth that enters meshing last when the blocking plate is closed and a second tooth next to the first tooth, the end surface of the first tooth facing the output shaft is farther away from the end surface of the second tooth facing the output shaft;

the teeth missing gear further has an arc-shaped groove, the radius of the outer surface of the arc-shaped groove is smaller than the radius of the outer surface of the arc section, the arc-shaped groove is located on the side of the arc section away from the output shaft, the outer surface of the arc section and the outer surface of the arc-shaped groove are connected by an inner end surface;

when the blocking plate is in the closed position, the arc-shaped groove accommodates the first tooth inside, and the outer surface of the arc section is partially located between the first tooth and the second tooth and abuts against the second tooth, the second tooth is prevented from rotating relative to the arc section, so that the teeth missing gear prevents the sector gear from rotating in the direction of opening the blocking plate.

15. The ventilation door device according to claim 14, wherein:

when the blocking plate is in the closed position, the distance between any point on the second tooth and the center of the teeth missing gear is greater than the radius of the arc section, so as to not prevent the arc section from rotating relative to the second tooth, so that the teeth missing gear can idly rotate by an idling angle ($\alpha$) in the direction of closing the ventilation door.

16. The ventilation door device according to claim 14, wherein:

the sector gear further has a third tooth next to the second tooth, the third tooth and the second tooth are connected by a connecting portion at the side adjacent to the output shaft;

the end faces of the third tooth and the second tooth on the side adjacent to the output shaft are closer to the output shaft than the end faces of the other teeth on the sector gear on the side adjacent to the output shaft.

17. The ventilation door device according to claim 14, wherein:

the radius of at least part of the addendum circle of the second tooth of the sector gear is smaller than the radius of the addendum circles of the remaining teeth.

18. The ventilation door device according to claim 14, wherein:

both ends of the arc section of the teeth missing gear are immediately connected to the gear teeth section, and the radius of the arc section of the teeth missing gear is larger than that of the addendum circle of the gear teeth section, and the outer peripheral surface of the arc section of the teeth missing gear and the tooth face of the first tooth of the gear teeth section that enters meshing firstly when the door is opened are connected by an arc-shaped guide surface.

* * * * *